United States Patent
Kim et al.

(10) Patent No.: US 11,432,694 B2
(45) Date of Patent: Sep. 6, 2022

(54) TRAVEL METHOD OF INTELLIGENT ROBOT CLEANER

(71) Applicant: LG Electronics Inc., Seoul (KR)

(72) Inventors: Taehyun Kim, Seoul (KR); Beomoh Kim, Seoul (KR); Jichan Maeng, Seoul (KR); Wonho Shin, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 396 days.

(21) Appl. No.: 16/493,546

(22) PCT Filed: Jul. 5, 2019

(86) PCT No.: PCT/KR2019/008315
§ 371 (c)(1),
(2) Date: Sep. 12, 2019

(87) PCT Pub. No.: WO2021/006364
PCT Pub. Date: Jan. 14, 2021

(65) Prior Publication Data
US 2021/0361136 A1 Nov. 25, 2021

(51) Int. Cl.
*G05B 19/04* (2006.01)
*G05B 19/18* (2006.01)
(Continued)

(52) U.S. Cl.
CPC ........... *A47L 9/2852* (2013.01); *A47L 9/2805* (2013.01); *A47L 9/2894* (2013.01); *B25J 9/1666* (2013.01);
(Continued)

(58) Field of Classification Search
CPC ........ B25J 19/02; B25J 9/1666; B25J 9/1697; G05D 1/02; G05D 1/0212; A47L 2201/04;
(Continued)

(56) References Cited

U.S. PATENT DOCUMENTS

| 11,036,230 B1 * | 6/2021 | Ebrahimi Afrouzi ....................... G05D 1/0221 |
| 2017/0131721 A1 * | 5/2017 | Kwak .................. G05D 1/0274 |

(Continued)

FOREIGN PATENT DOCUMENTS

| JP | 2003180587 | 7/2003 |
| JP | 5054010 | 10/2012 |

(Continued)

OTHER PUBLICATIONS

PCT International Application No. PCT/KR2019/008315, International Search Report dated Apr. 6, 2020, 4 pages.

*Primary Examiner* — Harry Y Oh
(74) *Attorney, Agent, or Firm* — Lee, Hong, Degerman, Kang & Waimey PC

(57) ABSTRACT

Disclosed herein is a travel method of an intelligent robot cleaner. According to the present disclosure, it is possible to minimize a cleaning travel path in a cleaning target region and thus reduce a cleaning time by accumulating a plus unit point when the cleaner travels along a plurality of cleaning travel paths, accumulating a minus unit point when the cleaner travels along an overlapped cleaning travel path among the plurality of cleaning travel paths, and determining a final cleaning travel path by learning the accumulated unit point. The intelligent robot cleaner can be associated with an artificial intelligence module, unmanned aerial (Continued)

vehicle (UAV), a robot, an augmented reality (AR) device, a virtual reality (VR) device, devices related to 5G services, and the like.

9 Claims, 21 Drawing Sheets

(51) Int. Cl.
| | | |
|---|---|---|
| A47L 9/28 | (2006.01) | |
| G06T 7/50 | (2017.01) | |
| G06T 7/11 | (2017.01) | |
| B25J 9/16 | (2006.01) | |
| G05D 1/02 | (2020.01) | |
| G06T 3/00 | (2006.01) | |
| H04L 5/00 | (2006.01) | |
| H04W 56/00 | (2009.01) | |
| H04W 72/12 | (2009.01) | |
| G06V 20/10 | (2022.01) | |
| G06N 3/08 | (2006.01) | |

(52) U.S. Cl.
CPC .......... *B25J 9/1697* (2013.01); *G05D 1/0212* (2013.01); *G06T 3/00* (2013.01); *G06T 7/11* (2017.01); *G06T 7/50* (2017.01); *G06V 20/10* (2022.01); *H04L 5/0048* (2013.01); *H04W 56/001* (2013.01); *H04W 72/1289* (2013.01); *A47L 2201/04* (2013.01); *G06N 3/08* (2013.01); *G06T 2200/04* (2013.01); *G06T 2207/20084* (2013.01)

(58) Field of Classification Search
CPC ........ A47L 9/28; A47L 9/2805; A47L 9/2852; A47L 9/2894; G06K 9/00664; G06N 3/08; G06T 2200/04; G06T 2207/20084; G06T 3/00; G06T 7/11; G06T 7/50; H04L 5/0048; H04N 7/18; H04W 56/001; H04W 72/1289

See application file for complete search history.

(56) References Cited

U.S. PATENT DOCUMENTS

| | | | | |
|---|---|---|---|---|
| 2019/0120633 | A1* | 4/2019 | Afrouzi | G01S 17/89 |
| 2019/0314987 | A1* | 10/2019 | Tang | A47L 11/4061 |
| 2019/0324473 | A1* | 10/2019 | Hillen | G05D 1/0274 |
| 2021/0041871 | A1* | 2/2021 | Lai | G05D 1/0219 |

FOREIGN PATENT DOCUMENTS

| | | |
|---|---|---|
| KR | 1020180018624 | 2/2018 |
| KR | 1020180134683 | 12/2018 |
| KR | 1020190030197 | 3/2019 |

\* cited by examiner (a)

(b)

TRAVEL METHOD OF INTELLIGENT ROBOT CLEANER

CROSS-REFERENCE TO RELATED APPLICATION

This application is a National Stage application under 35 U.S.C. § 371 of International Application No. PCT/KR2019/008315, filed on Jul. 5, 2019, the disclosure of which is incorporated by reference in its entirety.

TECHNICAL FIELD

The present disclosure relates to a travel method of an intelligent robot cleaner and, more particularly, to a travel method of an intelligent robot cleaner which minimizes a cleaning travel path in a cleaning target region according to an artificial intelligence learning result and consequently reduces a cleaning time.

BACKGROUND ART

A conventional intelligent robot cleaner sucks dust and foreign matter from a floor surface corresponding to a cleaning target region while traveling or moving along a preset travel path. In the case of cleaning along the preset travel path, the conventional intelligent robot cleaner sucks only the dust and the foreign matter of the floor surface around the preset travel path but does not suck the dust and the foreign matter of the floor surface corresponding to the cleaning target region spaced apart from the preset travel path.

Furthermore, the conventional intelligent robot cleaner sucks the dust and the foreign matter of the floor surface corresponding to the cleaning target region while traveling or moving along the cleaning target region at random without presetting the travel path. In the case of cleaning the cleaning target region at random, the conventional intelligent robot cleaner sucks the dust of the floor surface of the cleaning target region relatively clean, but is inefficient because the cleaner repetitively cleans the same space.

The conventional intelligent robot cleaner is problematic in that it is difficult to achieve a sufficiently clean state if the travel path is preset in the cleaning target region, and a relatively clean state is achieved but the cleaner repetitively travels or moves along the same space, thus undesirably increasing a cleaning time if the cleaner travels along the cleaning target region at random.

DISCLOSURE

Technical Problem

The present disclosure is intended to solve the above-described problem.

An embodiment of the present disclosure provides a travel method of an intelligent robot cleaner which minimizes a cleaning travel path in a cleaning target region according to an artificial intelligence learning result and consequently reduces a cleaning time.

Furthermore, another embodiment of the present disclosure provides a travel method of an intelligent robot cleaner which can considerably reduce a cleaning time, by continuously learning a cleaning travel path through AI processing and selecting an optimum cleaning travel path.

Furthermore, a further embodiment of the present disclosure provides a travel method of an intelligent robot cleaner which reduces a cleaning time and extends a battery life.

Technical Solution

In this specification, there is provided a travel method of an intelligent robot cleaner, including extracting a cleaning space using an image photographed while traveling inside a building; generating a 3D image in the cleaning space, and generating a 2D image by converting the 3D image; simplifying the 2D image; indicating the simplified 2D image as a 2D coordinate, and generating a plurality of ends and a plurality of intersections in the 2D coordinate; measuring a distance between the plurality of ends, a distance between the plurality of intersections, and a distance between the plurality of ends and intersections, and setting a unit point corresponding to each of the measured distances; forming a plurality of cleaning travel paths based on the unit point; and accumulating a plus unit point when the cleaner travels along the plurality of cleaning travel paths, accumulating a minus unit point when the cleaner travels along an overlapped cleaning travel path among the plurality of cleaning travel paths, and determining a final cleaning travel path by analyzing the accumulated unit point.

The determining of the final cleaning travel path may include inputting the set unit point into a point artificial neural network classifier; learning based on an output unit point outputted from the point artificial neural network classifier; and determining the final cleaning travel path by analyzing the learned output unit point.

The final cleaning travel path may have a higher probability that it is finally selected, as the accumulated unit point becomes higher and higher.

The generating of the 2D image may extract spatial data from the 3D image, may convert the extracted spatial data into plane data, and may generate the 2D image using the converted plane data.

The simplifying of the 2D image may extract a first region that allows cleaning and a second region that does not require cleaning from the 2D image, may remove the second region and thereby may simplify the 2D image.

The extracting of the cleaning space may include extracting an image characteristic value from the image photographed while the cleaner traveling inside the building; inputting the image characteristic value into the artificial neural network classifier; analyzing an output value outputted from the artificial neural network classifier; and extracting the cleaning space inside the building from the output value.

The extracting of the cleaning space may analyze a cleaning map to extract the cleaning space of the building, when there is the cleaning map for an inside of the building.

The minus unit point may be produced by multiplying the plus unit point and minus 1.5.

The cleaner may travel along only the overlapped cleaning travel path, in the case of traveling along the overlapped cleaning travel path among the plurality of cleaning travel paths.

The travel method may further include receiving downlink control information (DCI) used to schedule transmission of a unit point sensed from the image photographed by the intelligent robot cleaner from a network, wherein the sensed unit point may be transmitted to the network based on the DCI.

The travel method may further include performing an initial access procedure with the network based on a synchronization signal block (SSB), wherein the sensed unit point may be transmitted through PUSCH to the network, and the SSB and DM-RS of the PUSCH may be quasi co-located (QCL) for a QCL type D.

The travel method may further include controlling a communication unit to transmit the sensed unit point to an AI processor included in the network; and controlling the communication unit to receive AI processed information from the AI processor, wherein the AI processed information may be information that determines the final cleaning travel path among the plurality of cleaning travel paths.

Advantageous Effects

The effects of a travel method of an intelligent robot cleaner in accordance with the present disclosure will be described as follows.

The present disclosure has an advantage in that it can minimize a cleaning travel path in a cleaning target region according to an artificial intelligence learning result and consequently can reduce a cleaning time.

Furthermore, the present disclosure has an advantage in that it can considerably reduce a cleaning time, by continuously learning a cleaning travel path through AI processing and selecting an optimum cleaning travel path.

Furthermore, the present disclosure has an advantage in that it can reduce a cleaning time and thereby extend a battery life.

Furthermore, the present disclosure has an advantage in that it can improve cleaning efficiency of an intelligent robot cleaner by reducing a cleaning time and extending a battery life.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
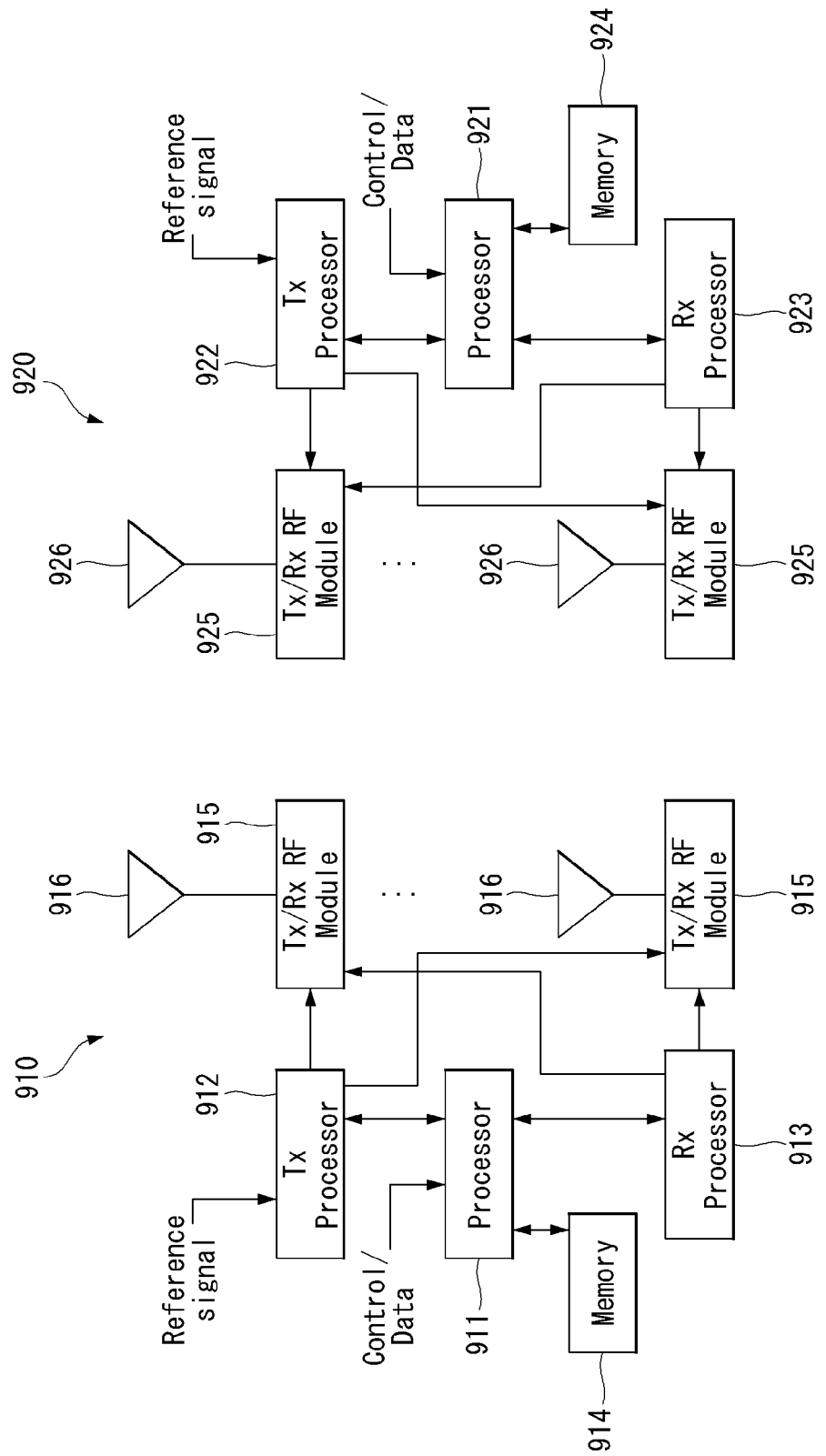
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
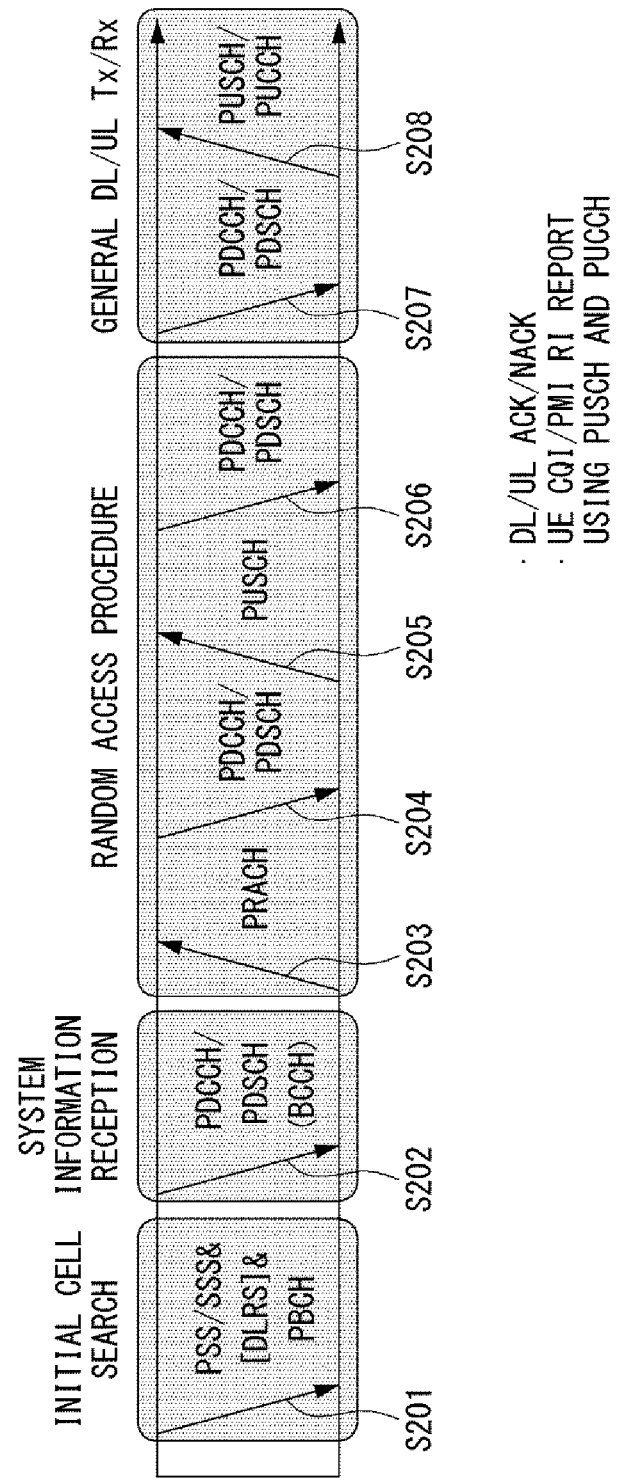
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource- SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
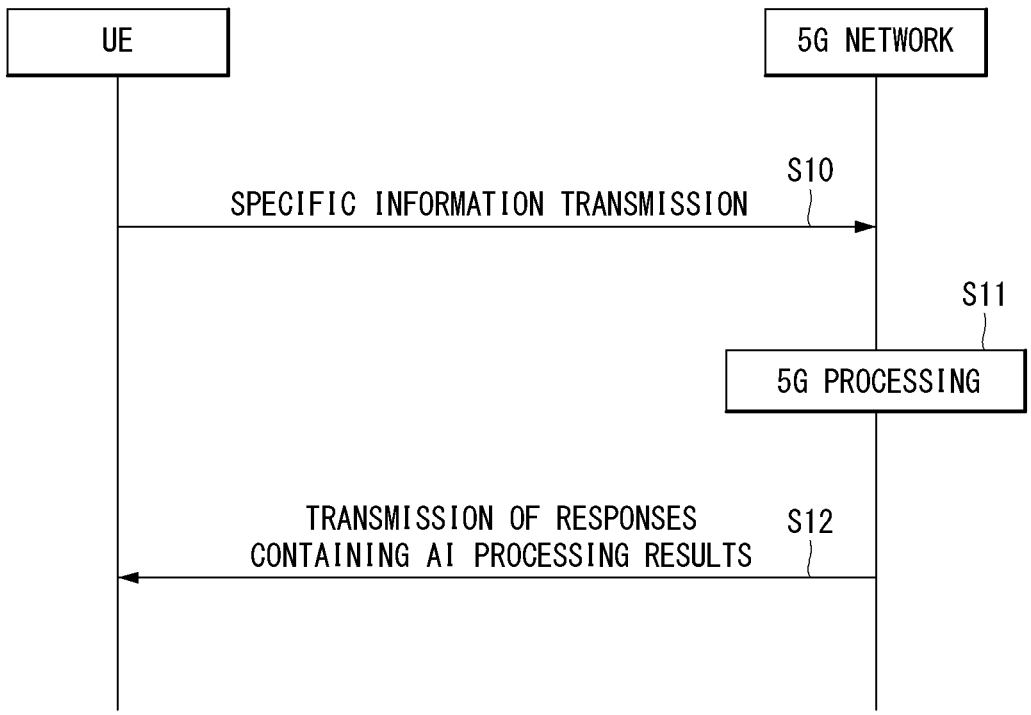
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
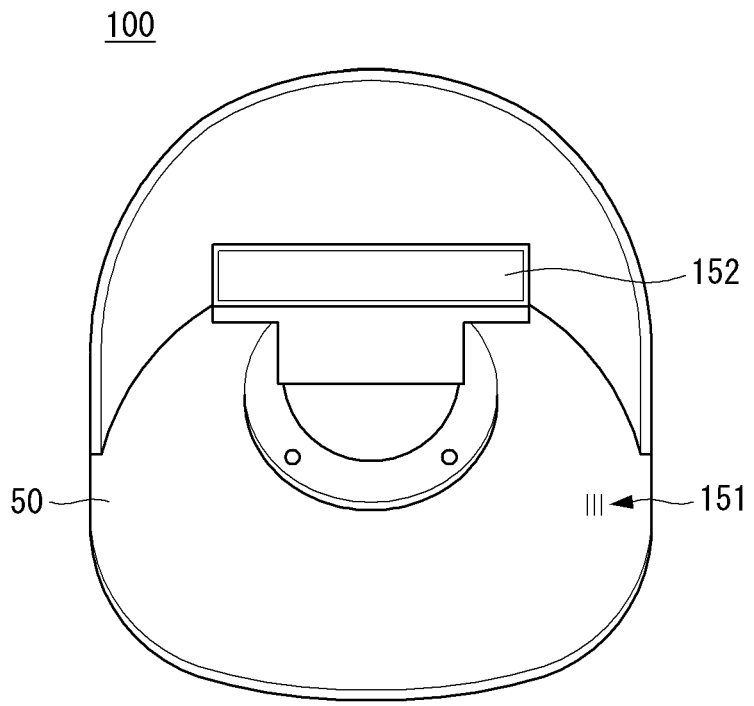
FIG. 4 is a perspective view of an intelligent robot cleaner in accordance with an embodiment of the present disclosure when seen from above.
Figure 5:
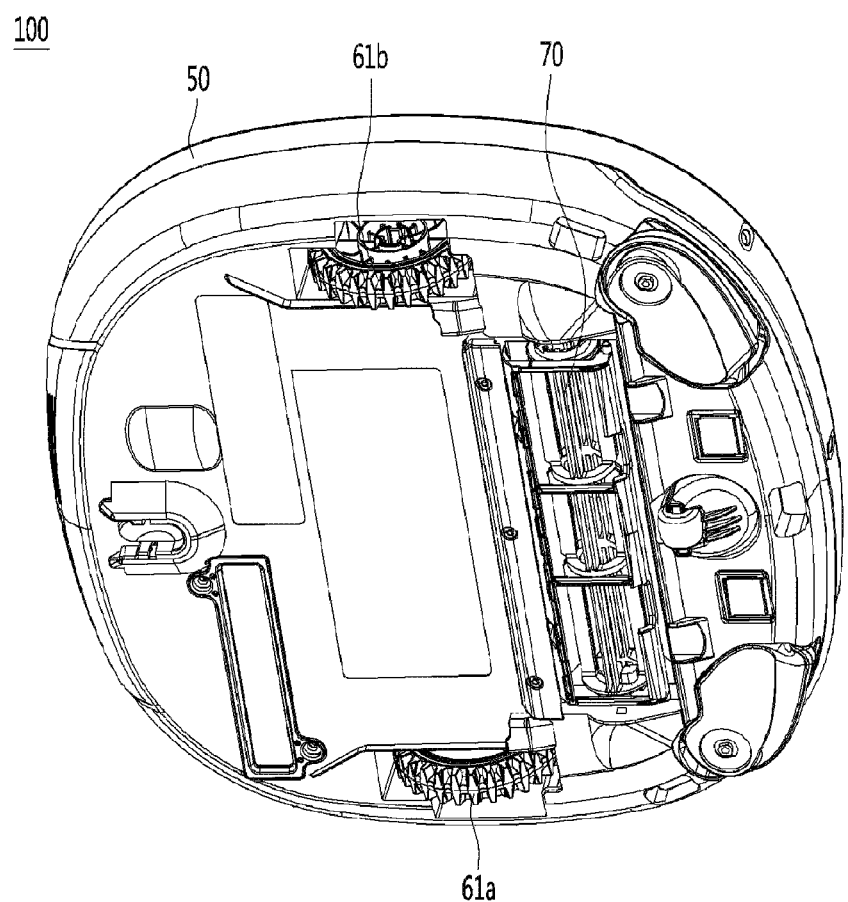
FIG. 5 is a perspective view of the intelligent robot cleaner in accordance with the embodiment of the present disclosure when seen from below.
Figure 6:
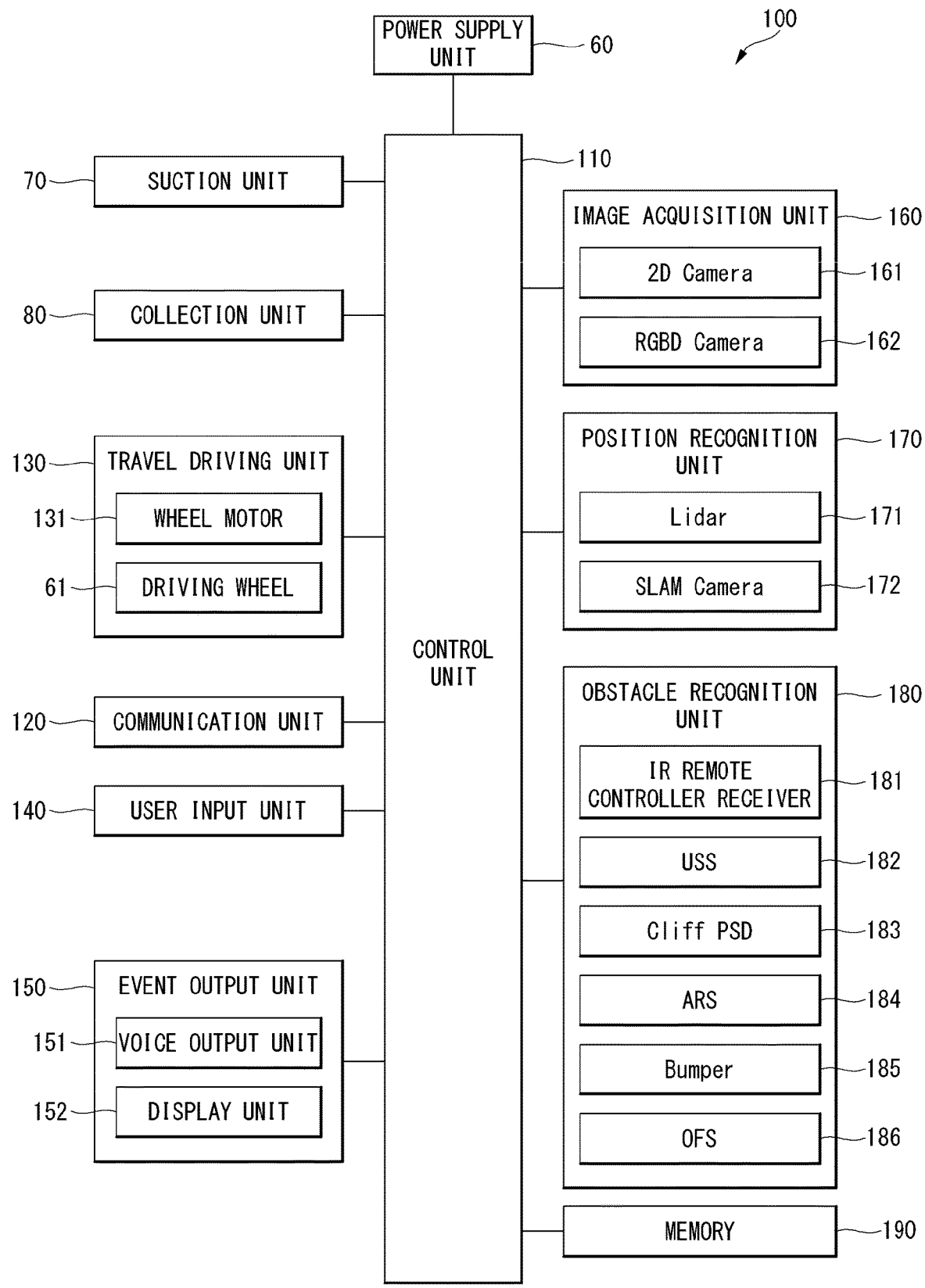
FIG. 6 is a block diagram showing the configuration of the intelligent robot cleaner in accordance with the embodiment of the present disclosure.

FIGS. 4 and 5 are perspective views of an intelligent robot cleaner in accordance with an embodiment of the present disclosure. FIG. 4 is a perspective view of the intelligent robot cleaner in accordance with the embodiment of the present disclosure when seen from above. FIG. 5 is a perspective view of the intelligent robot cleaner in accordance with the embodiment of the present disclosure when seen from below. FIG. 6 is a block diagram showing the configuration of the intelligent robot cleaner in accordance with the embodiment of the present disclosure.

Referring to FIGS. 4 to 6, the intelligent robot cleaner 100 in accordance with the embodiment of the present disclosure may include a housing 50, a suction unit 70, a collection unit 80, a power supply unit 60, a control unit 110, a communication unit 120, a travel driving unit 130, a user input unit 140, an event output unit 150, an image acquisition unit 160, a position recognition unit 170, an obstacle recognition unit 180 and a memory 190.

The housing 50 may provide a space in which internal components are installed, and may define the appearance of the intelligent robot cleaner 100. The housing 50 may protect the components installed in the intelligent robot cleaner 100 from being protected from an outside.

The power supply unit 60 may include a battery driver and a lithium-ion battery. The battery driver may manage the charging or discharging of the lithium-ion battery. The lithium-ion battery may supply power for driving the robot. The lithium-ion battery may be made by connecting two 24V/102A lithium-ion batteries in parallel.

The suction unit 70 may suck dust or foreign matter from a cleaning target region. The suction unit 70 may use the principle of forcing air to flow using a fan that is rotated by a motor or the like.

The collection unit 80 may be connected to the suction unit 70 via a predetermined pipe. The collection unit 80 may include a predetermined space to collect dust, foreign matter or an article sucked through the suction unit 70. The collection unit 80 may be detachably mounted on the housing 50. The collection unit 80 may collect the dust, the foreign matter or the article sucked through the suction unit 70 while the collection unit is mounted on the housing 50. The collection unit 80 may be detached from the housing 50 to take out or throw away the collected dust, foreign matter or article. The collection unit 80 may be referred to as a dust box, a foreign-matter container or the like.

The control unit 110 may include a microcomputer to control the power supply unit 60 including the battery in a hardware of the intelligent robot cleaner 100, the obstacle recognition unit 180 including various sensors, the travel driving unit 130 including a plurality of motors and wheels, and the collection unit 80.

The control unit 110 may include an application processor (AP). The application processor (AP) may perform the function of controlling an entire system of a hardware module of the intelligent robot cleaner 100. The control unit 110 may be referred to as a processor. The AP is intended to drive an application program for the travel using position information acquired via various sensors and to drive the motor by transmitting user input/output information to the microcomputer. Furthermore, the AP may control the user input unit 140, the image acquisition unit 160, the position recognition unit 170.

Furthermore, the control unit 110 may include the AI processor 111. The AI processor 111 may learn a neural network using a program stored in the memory 190. Particularly, the AI processor 111 may learn a neural network for recognizing an image acquired by the intelligent robot cleaner 100, a neural network for recognizing a travel path along which the cleaner travels based on the acquired image, and a neural network for recognizing an obstacle in the acquired image. Here, the neural network may include a deep learning model developed from a neural network model. While a plurality of network nodes is located at different layers in the deep learning model, the nodes may exchange data according to a convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM,), a deep belief network (DBN) or a deep Q-Network, and may be applied to fields such as computer vision, voice recognition, natural language processing, voice/signal processing or the like.

The intelligent robot cleaner 100 may implement the function of analyzing an image of an object acquired by the image acquisition unit 160, recognizing the position of the object and recognizing an obstacle, by applying the deep learning model through the AI processor 111. Furthermore, the intelligent robot cleaner 100 may implement the function of analyzing the image of an object acquired by the image acquisition unit 160, recognizing the position of the object and recognizing an obstacle, by applying the deep learning model through the AI processor 111. The intelligent robot cleaner 100 may implement at least one of the above-described functions by receiving the AI processing result from an external server through the communication unit 120.

The communication unit 120 may further include a component receiving a signal/data from external input, and various additional components, such as a wireless communication module (not shown) for wireless communication or a tuner (not shown) for tuning a broadcast signal, according to the design method of the intelligent robot cleaner 100. The communication unit 120 may not only receive a signal from an external device, but also may transmit the information/data/signal of the intelligent robot cleaner 100 to the external device. That is, the communication unit 120 may be implemented as an interface facilitating two-way communication, without being limited to only the configuration of receiving the signal of the external device. The communication unit 120 may receive a control signal for selecting an UI from a plurality of control devices. The communication unit 120 may include wireless communication, wire communication and mobile communication modules. For example, the communication unit 120 may be configured as a communication module for known near field wireless communication, such as wireless LAN (WiFi), Bluetooth, Infrared (IR), Ultra Wideband (UWB) or Zigbee. The communication unit 120 may be configured as a mobile communication module such as 3G, 4G, LTE or 5G communication modules. The communication unit 120 may be configured as a known communication port for wire communication. The communication unit 120 may be used for various purposes. For example, the communication unit may be used to transmit and receive a control signal for selecting the UI, a command for manipulating a display, or data.

The travel driving unit 130 may include a wheel motor 131 and a driving wheel 61. The driving wheel 61 may include first and second driving wheels 61a and 61b. The wheel motor 131 may control the first driving wheel 61a and the second driving wheel 61b. The wheel motor 131 may be driven under the control of the travel driving unit 130. The first driving wheel 61a and the second driving wheel 61b fastened to the wheel motor 131 may be individually separated. The first driving wheel 61a and the second driving wheel 61b may be operated independently from each other. Thus, the intelligent robot cleaner 100 may be moved forwards/backwards and rotated in either direction.

The user input unit 140 may transmit various control commands or information, which are preset by a user's manipulation and input, to the control unit 110. The user input unit 140 may be made as a menu-key or an input panel provided on an outside of the intelligent robot cleaner, a remote controller separated from the intelligent robot cleaner 100 or the like. Alternatively, some components of the user input unit 140 may be integrated with a display unit 152. The display unit 152 may be a touch-screen. For example, a user touches an input menu displayed on the display unit 152 that is the touch-screen to transmit a preset command to the control unit 110.

The user input unit 140 may sense a user's gesture through the sensor that senses an interior of the region and transmit his or her command to the control unit 110. Alternatively, the user input unit 140 may transmit a user's voice command to the control unit 110 to perform an operation and setting.

When an object is extracted from an image acquired through the image acquisition unit 160 or other event situations occur, the event output unit 150 may be configured to inform a user of the event situation. The event extraction unit 150 may include a voice output unit 151 and the display unit 152.

The voice output unit 151 may output a pre-stored voice message when a specific event occurs.

The display unit 152 may display a pre-stored message or image when a specific event occurs. The display unit 152 may display the driving state of the intelligent robot cleaner 100 or display additional information, such as the date/time/temperature/humidity of a current state.

The image acquisition unit 160 may include a 2D camera 161 and a RGBD camera 162. The 2D camera 161 may be a sensor for recognizing a person or an article based on a 2D image. The RGBD (Red, Green, Blue and Distance) camera 162 may be a sensor for detecting a person or an article using captured images having depth data acquired from a camera having RGBD sensors or other similar 3D imaging devices.

The image acquisition unit 160 may acquire the image on the travel path of the intelligent robot cleaner 100 and then provide the acquired image data to the control unit 110. The control unit 110 may set or reset the travel path based on the acquired image data.

The position recognition unit 170 may include a light detection and ranging (lidar) 171 and a simultaneous localization and mapping (SLAM) camera 172.

The SLAM camera may implement concurrent position tracking and mapping techniques. The intelligent robot cleaner 100 may detect information about surrounding environment using the SLAM camera 172 and then may process the obtained information to prepare a map corresponding to a mission execution space and simultaneously estimate the absolute position of the cleaner.

The lidar 171 is a laser radar, and may be a sensor that radiates a laser beam, collects and analyzes backscattered light among light absorbed or scattered by an aerosol to recognize a position.

The position recognition unit 170 may process sensing data collected from the lidar 171 and the SLAM camera 172 to manage data for recognizing the robot's position and the obstacle.

The obstacle recognition unit 180 may include an IR remote controller receiver 181, an USS 182, a Cliff PSD 183, an ARS 184, a bumper 185, and an OFS 186.

The IR remote controller receiver 181 may include a sensor that receives a signal of the IR (infrared) remote controller to remotely control the intelligent robot cleaner 100.

The ultrasonic sensor (USS) 182 may include a sensor to determine a distance between the obstacle and the robot using an ultrasonic signal.

The Cliff PSD 183 may include a sensor to sense a cliff or a precipice in a travel range of the intelligent robot cleaner 100 in all directions at 360 degrees.

The attitude reference system (ARS) 184 may include a sensor to detect the attitude of the robot. The ARS 184 may include a sensor configured as three axes of acceleration and three axes of gyro to detect the rotating amount of the intelligent robot cleaner 100.

The bumper 185 may include a sensor to sense a collision between the intelligent robot cleaner 100 and the obstacle. The sensor included in the bumper 185 may sense the collision between the intelligent robot cleaner 100 and the obstacle in a range of 360 degrees.

The optical flow sensor (OFS) 186 may include a sensor that may measure the travel distance of the intelligent robot cleaner 100 on various floor surfaces and a phenomenon in which the intelligent robot cleaner 100 runs idle during the travel.

The memory 190 may store a name of an article corresponding to the obstacle, and image information corresponding thereto.

Figure 7:
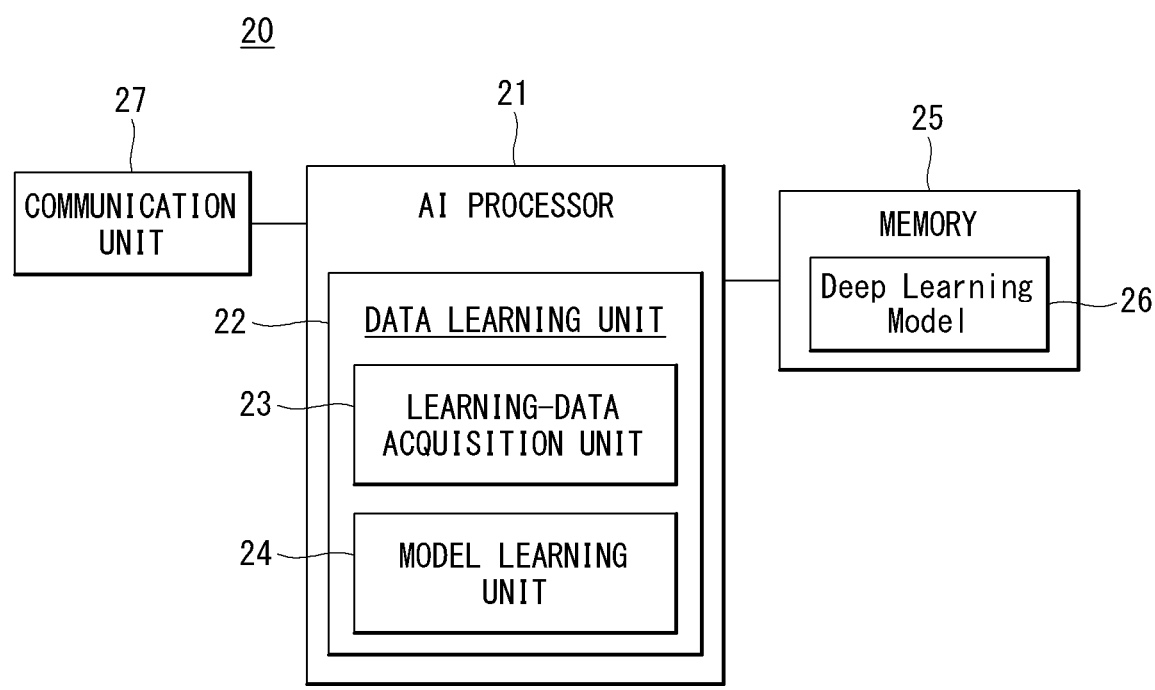
FIG. 7 is a diagram showing an AI device in accordance with the embodiment of the present disclosure.

FIG. 7 is a block diagram of an AI device in accordance with the embodiment of the present disclosure.

The AI device 20 may include electronic equipment that includes an AI module to perform AI processing or a server that includes the AI module. Furthermore, the AI device 20 may be included in at least a portion of the intelligent robot cleaner 100 illustrated in FIG. 6, and may be provided to perform at least some of the AI processing.

The AI processing may include all operations related to the function of the intelligent robot cleaner 100 illustrated in FIG. 6. For example, the intelligent robot cleaner 100 may AI-process sensing data or travel data to perform processing/determining and a control-signal generating operation. Furthermore, for example, the intelligent robot cleaner 100 may AI-process data acquired through interaction with other electronic equipment provided in the intelligent robot cleaner 100 to control sensing.

The AI device 20 may include an AI processor 21, a memory 25 and/or a communication unit 27.

The AI device 20 may be a computing device capable of learning a neural network, and may be implemented as various electronic devices such as a server, a desktop PC, a laptop PC or a tablet PC.

The AI processor 21 may learn the neural network using a program stored in the memory 25. Particularly, the AI processor 21 may learn the neural network for recognizing data related to the intelligent robot cleaner 100. Here, the neural network for recognizing data related to the intelligent robot cleaner 100 may be designed to simulate a human brain structure on the computer, and may include a plurality of network nodes having weights that simulate the neurons of the human neural network. The plurality of network nodes may exchange data according to the connecting relationship to simulate the synaptic action of neurons in which the neurons exchange signals through synapses. Here, the neural network may include the deep learning model developed from the neural network model. While the plurality of network nodes is located at different layers in the deep learning model, the nodes may exchange data according to the convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM,), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g. CPU), but may be an AI dedicated processor (e.g. GPU) for artificial intelligence learning.

The memory 25 may store various programs and data required to operate the AI device 20. The memory 25 may be implemented as a non-volatile memory, a volatile memory, a flash memory), a hard disk drive (HDD) or a solid state drive (SDD). The memory 25 may be accessed by the AI processor 21, and reading/writing/correcting/deleting/update of data by the AI processor 21 may be performed.

Furthermore, the memory 25 may store the neural network model (e.g. the deep learning model 26) generated through a learning algorithm for classifying/recognizing data in accordance with the embodiment of the present disclosure.

The AI processor 21 may include a data learning unit 22 which learns the neural network for data classification/recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including instructions), the software module may be stored in a non-transitory computer readable medium. In this case, at least one software module may be provided by an operating system (OS) or an application.

The data learning unit 22 may include the learning-data acquisition unit 23 and the model learning unit 24.

The learning-data acquisition unit 23 may acquire the learning data needed for the neural network model for classifying and recognizing the data. For example, the learning-data acquisition unit 23 may acquire vehicle data and/or sample data which are to be inputted into the neural network model, as the learning data.

The model learning unit 24 may learn to have a determination criterion about how the neural network model classifies predetermined data, using the acquired learning data. The model learning unit 24 may learn the neural network model, through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

If the neural network model is learned, the model learning unit 24 may store the learned neural network model in the memory. The model learning unit 24 may store the learned neural network model in the memory of the server connected to the AI device 20 with a wire or wireless network.

The data learning unit 22 may further include a learning-data preprocessing unit (not shown) and a learning-data selection unit (not shown) to improve the analysis result of the recognition model or to save resources or time required for generating the recognition model.

The learning-data preprocessing unit may preprocess the acquired data so that the acquired data may be used for learning for situation determination. For example, the learning-data preprocessing unit may process the acquired data in a preset format so that the model learning unit 24 may use the acquired learning data for learning for image recognition.

Furthermore, the learning-data selection unit may select the data required for learning among the learning data acquired by the learning-data acquisition unit 23 or the learning data preprocessed in the preprocessing unit. The selected learning data may be provided to the model learning unit 24. For example, the learning-data selection unit may select only data on the object included in a specific region as the learning data, by detecting the specific region in the image acquired by the camera of the intelligent robot cleaner 100.

Furthermore, the data learning unit 22 may further include a model evaluation unit (not shown) to improve the analysis result of the neural network model.

When the model evaluation unit inputs evaluated data into the neural network model and the analysis result outputted from the evaluated data does not satisfy a predetermined criterion, the model learning unit 22 may learn again. In this case, the evaluated data may be predefined data for evaluating the recognition model. By way of example, the model evaluation unit may evaluate that the predetermined criterion is not satisfied when the number or ratio of the evaluated data in which the analysis result is inaccurate among the analysis result of the learned recognition model for the evaluated data exceeds a preset threshold.

The communication unit 27 may transmit the AI processing result by the AI processor 21 to the external electronic equipment.

Here, the external electronic equipment may be defined as the intelligent robot cleaner 100. Furthermore, the AI device 20 may be defined as another intelligent robot cleaner 100 or a 5G network that communicates with the intelligent robot cleaner 100. Meanwhile, the AI device 20 may be implemented by being functionally embedded in an autonomous driving module provided in the intelligent robot cleaner 100. Furthermore, the 5G network may include a server or a module that performs related control of the intelligent robot cleaner 100.

Although the AI device 20 illustrated in FIG. 7 is functionally divided into the AI processor 21, the memory 25, the communication unit 27 and the like, it is to be noted that the above-described components are integrated into one module, which is referred to as an AI module.

Figure 8:
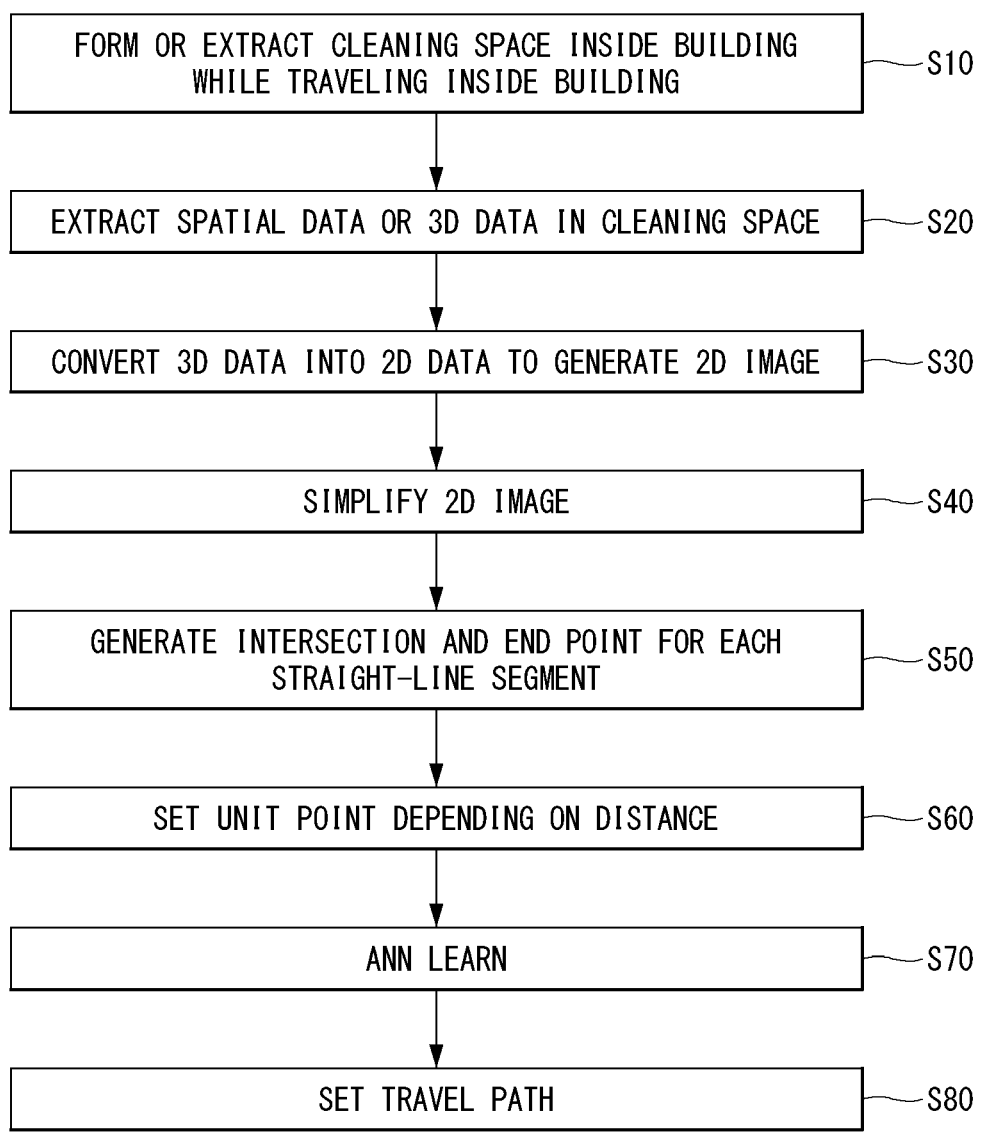
FIG. 8 is a flowchart illustrating a travel method of an intelligent robot cleaner in accordance with an embodiment of the present disclosure.

FIG. 8 is a flowchart illustrating a travel method of an intelligent robot cleaner in accordance with an embodiment of the present disclosure.

Referring to FIG. 8, the travel method of the intelligent robot cleaner in accordance with the embodiment of the present disclosure is as follows.

If there is a cleaning map for an inside of a building, the intelligent robot cleaner 100 (see FIG. 6) may receive the cleaning map from an external device, and may identify a cleaning space or a cleaning target region using the cleaning map. On the other hand, if there is no cleaning map for the inside of the building, the intelligent robot cleaner 100 (see FIG. 6) may acquire a surrounding image using the image acquisition unit 160 (see FIG. 6) while traveling inside the building. The intelligent robot cleaner 100 may photograph and acquire an image on the travel path, the surrounding image of the travel path, and an image of a building structure, such as a wall or a door in the building through the image acquisition unit 160, at step S10.

The intelligent robot cleaner 100 may acquire various images from the image acquisition unit 160 under the control of the control unit 110, and may convert each of the acquired images into the characteristic value of the image.

The intelligent robot cleaner 100 may input a plurality of image characteristic values into an ANN classifier. The intelligent robot cleaner 100 may analyze an ANN output value under the control of the control unit 110, and may extract the cleaning space for the inside of the building from the ANN output value.

The intelligent robot cleaner 100 may convert a 3D image for the transmitted cleaning space or the extracted cleaning space into a 2D image. For example, the intelligent robot cleaner 100 may extract spatial data (or stereoscopic data, 3D data) from the cleaning space under the control of the control unit 110 at step S20, and may convert the extracted spatial data into plane data (or 2D data). The intelligent robot cleaner 100 may generate the 2D image using the converted plane data at step S30.

The intelligent robot cleaner 100 may simplify the 2D image generated under the control of the control unit 110 at step S40. The intelligent robot cleaner 100 may simplify the 2D image by indicating only some of parts other than a region that may be cleaned in the 2D image or by eliminating all the parts. For example, the intelligent robot cleaner 100 may indicate the cleaning region as a grid in the 2D image, and may extract or select a region that does not need to be cleaned from the region indicated by the grid to remove the region. Thus, the intelligent robot cleaner 100 may simplify the 2D image by indicating only the region that may be cleaned in the 2D image.

The intelligent robot cleaner 100 may generate an end or an intersection on a region indicated by the grid in the simplified 2D image under the control of the control unit 110 at step S50. The end may be referred to as an end point or a unidirectional progress point, and the intersection may be referred to as a cross point or a multidirectional progress point. For example, the intelligent robot cleaner 100 may generate the end point or the unidirectional progress point on both extremities of the region indicated by the grid, respectively, and may generate the cross point or the multidirectional progress point at a point where the region indicated by the grid intersects.

The intelligent robot cleaner 100 may convert a portion between the generated ends, or a portion between the end and the intersection, or a portion between the intersections into a straight line to indicate it.

The intelligent robot cleaner 100 may set a unit point depending on a distance or an interval at step S60. The intelligent robot cleaner 100 may measure a distance between the end points, a distance between the end point and the cross point, and a distance between the cross points under the control of the control unit, and may set the unit point for each of these distances. The distance may be referred to as the spacing distance or interval.

The intelligent robot cleaner 100 may learn by inputting the set point into the point ANN classifier at step S70. The intelligent robot cleaner 100 may input a point set under the control of the control unit 110 into the point ANN classifier and may learn based on the output ANN point outputted from the point ANN classifier.

The intelligent robot cleaner 100 may analyze a learned ANN point value, and may set a cleaning travel path in response to the surrounding event generated in real time at step S80.

FIGS. 9 to 15 are diagrams illustrating a method in which the intelligent robot cleaner forms a cleaning map according to an artificial intelligence learning result in accordance with the embodiment of the present disclosure.

If there is the cleaning map for the inside of the building, the intelligent robot cleaner 100 may receive the cleaning map from the external device, and may extract the cleaning space of the building based on the cleaning map.

Figure 9:
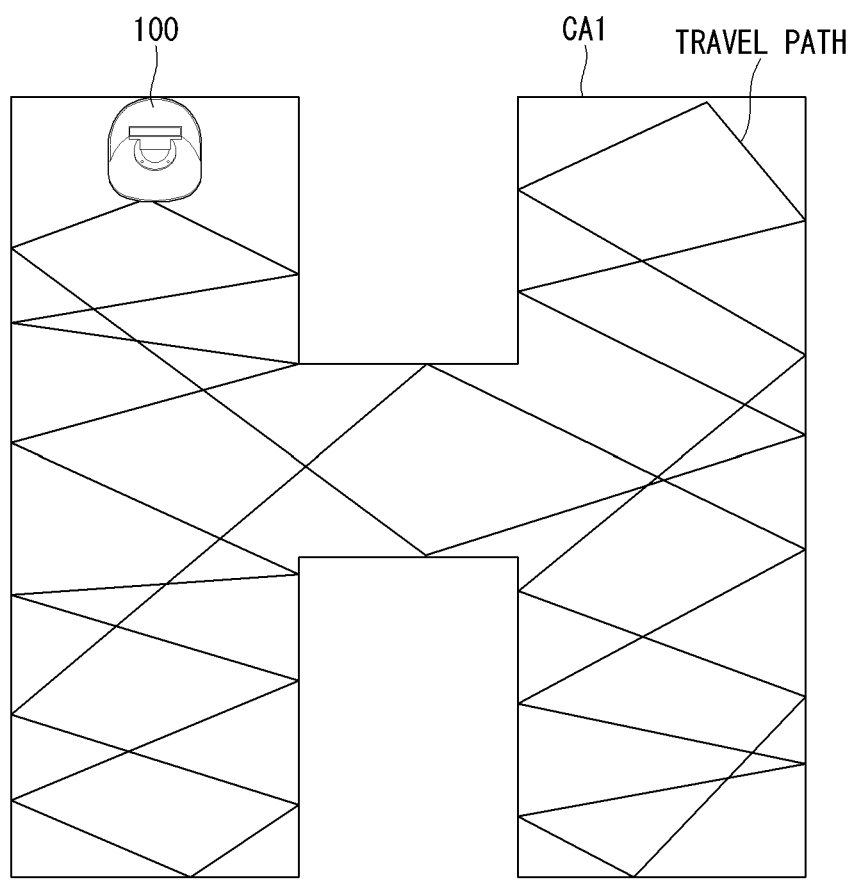
FIGS. 9 to 15 are diagrams illustrating a method in which the intelligent robot cleaner forms a cleaning map according to an artificial intelligence learning result in accordance with the embodiment of the present disclosure.

If there is no cleaning map for the inside of the building, the intelligent robot cleaner 100 may predict or extract an internal space CA1 of the building while being randomly traveled in the building, as illustrated in FIG. 9.

The intelligent robot cleaner 100 may photograph and acquire an image on the travel path, the surrounding image of the travel path, and an internal image of a building, such as a wall or a door in the building through the image acquisition unit while being randomly traveled in the building.

The intelligent robot cleaner 100 may extract the internal structure of the building using the acquired internal image of the building. For example, the intelligent robot cleaner 100 may extract the image characteristic value from a plurality of photographed images during the travel. The intelligent robot cleaner 100 may input the extracted image characteristic value into the ANN classifier. The intelligent robot cleaner 100 may analyze the ANN output value under the control of the control unit 110, and may predict or estimate the internal structure of the building from the ANN output value. The intelligent robot cleaner 100 may repeatedly analyze the predicted internal structure of the building and the acquired image to set a cleaning space in consideration of the positions of a wall, a door and a fixed obstacle in the internal structure of the building.

Figure 10:
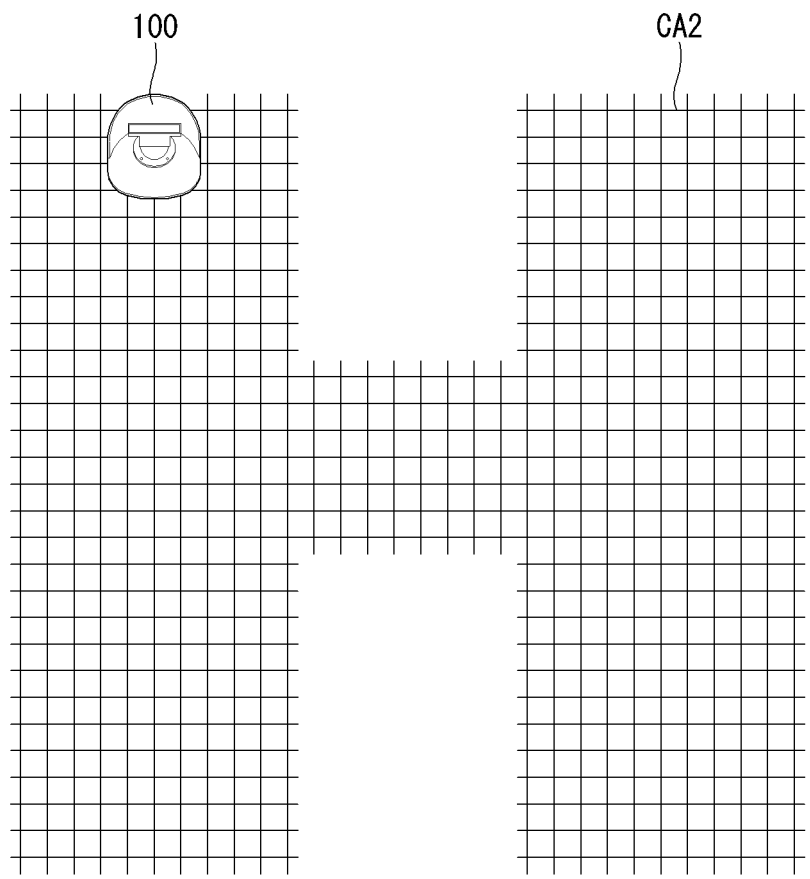

As illustrated in FIG. 10, the intelligent robot cleaner 100 may convert the cleaning space set under the control of the control unit 110 into the 3D image, and may generate the converted 3D image as the 2D image. That is, the intelligent robot cleaner 100 may extract the spatial data (or stereoscopic data, 3D data) in the cleaning space under the control of the control unit 110, and may convert the extracted spatial data into the plane data (or 2D data). The intelligent robot cleaner 100 may generate the 2D image using the converted plane data.

The intelligent robot cleaner 100 may simply indicate the cleaning region as the grid CA2 in the 2D image generated under the control of the control unit 110. That is, the intelligent robot cleaner 100 may form the cleaning region CA2 indicated as the grid by simplifying the cleaning region in the 2D image generated under the control of the control unit 110.

Figure 11:
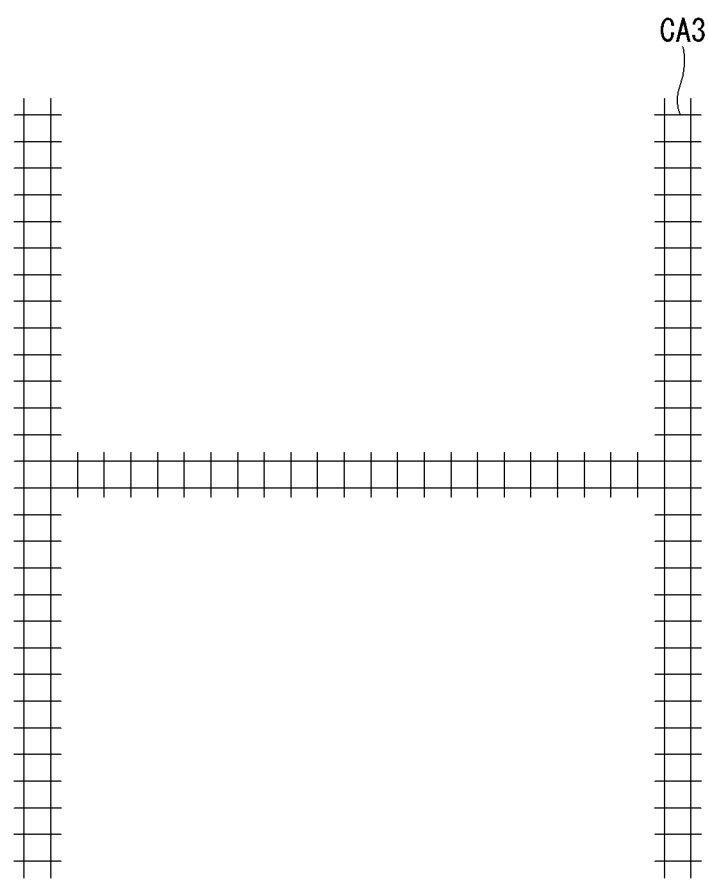

As illustrated in FIG. 11, the intelligent robot cleaner 100 may extract or select a region where the obstacle is located or cleaning is not needed in the cleaning region CA2 indicated as the grid, thus removing the region. Thus, the intelligent robot cleaner 100 may further simplify the cleaning region by removing the region where cleaning is not needed and indicating only a region CA3 that may be cleaned in the 2D image.

Figure 12:
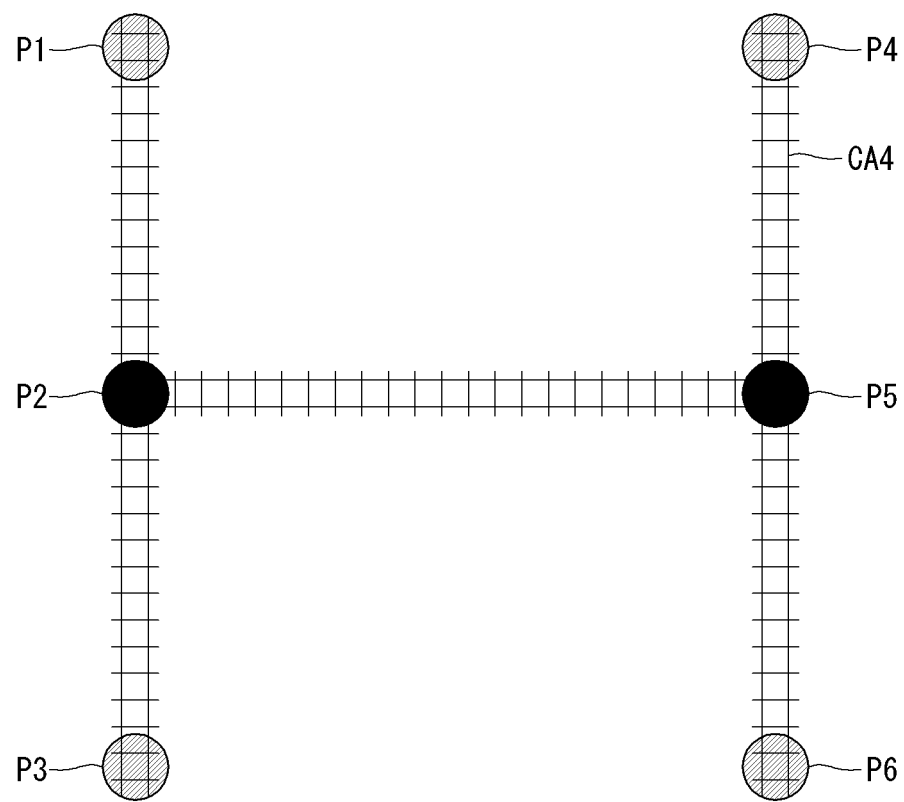

As illustrated in FIG. 12, the intelligent robot cleaner 100 may generate the end point or the cross point in the region CA4 that is simply indicated as the grid in the simplified 2D image under the control of the control unit 110. The intelligent robot cleaner 100 may generate end points on both extremities of the region indicated as the grid, respectively, and may generate a cross point at a point where regions indicated as the grid intersect each other. For example, a plurality of points P1 to P6 may include a first point P1 to a sixth point P6. The first point P1 may be located at a left upper extremity of the cleaning region CA5. The third point P3 may be located at a left lower extremity of the cleaning region CA5. The second point P2 may be located between the first point P1 and the third point P3. The fourth point P4 may be located at a right upper extremity of the cleaning region CA5. The sixth point P6 may be located at a right lower extremity of the cleaning region CA5. The fifth point P5 may be located between the fourth point P4 and the sixth point P6.

Each of the first point P1, the third point P3, the fourth point P4 and the sixth point P6 may be the end point or the unidirectional progress point, while each of the second point P2 and the fifth point P5 may be the cross point or the multidirectional progress point.

Figure 13:
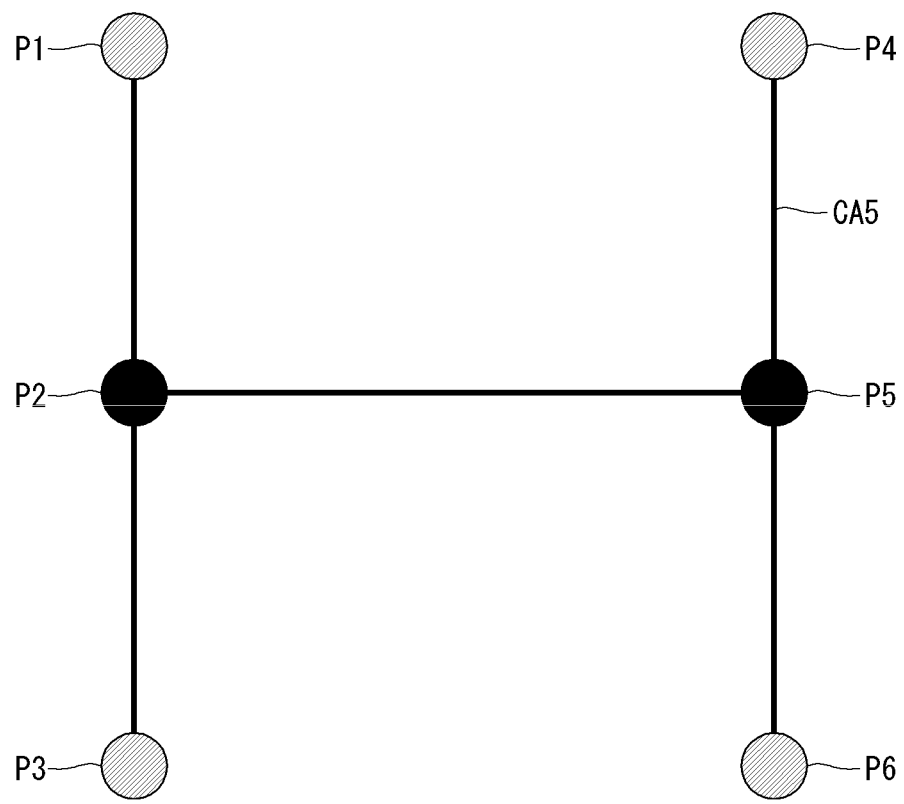

As illustrated in FIG. 13, the intelligent robot cleaner 100 may convert a portion between the generated end points, or a portion between the end point and the cross point, or a portion between the cross points into a straight line to indicate it. Thus, the 2D image may be further simplified. The intelligent robot cleaner 100 may minimize the capacity of the 2D image, by simply expressing the cleaning region CA5 with the plurality of points P1 to P6 and the plurality of straight lines.

As illustrated in FIG. 14A, the intelligent robot cleaner 100 may form a plurality of straight lines L1 to L5 that connect the plurality of points P1 to P6 to each other. For example, the plurality of straight lines L1 to L5 may include a first straight line L1 to a fifth straight line L5. The first straight line L1 may be formed between the first point P1 and the second point P2. The second straight line L2 may be formed between the second point P2 and the fifth point P5. The third straight line L3 may be formed between the fourth point P4 and the fifth point P5. The fourth straight line L4 may be formed between the second point P2 and the third point P3. The fifth straight line L5 may be formed between the fifth point P5 and the sixth point P6. The number of the straight lines may be less than the number of the points.

As illustrated in FIG. 14B, the intelligent robot cleaner 100 may set a unit point depending on the distance or the interval. The intelligent robot cleaner 100 may measure a distance between the end points, a distance between the end point and the cross point, and a distance between the cross points under the control of the control unit 110, and may set the unit point for each of these distances. For example, the intelligent robot cleaner 100 may set each unit point for each of the plurality of straight lines L1 to L5. The intelligent robot cleaner 100 may measure the first straight line L1, and may set 10 unit points for the measured first straight line L1. The intelligent robot cleaner 100 may measure each of the second straight line L2 to the fifth straight line L5, and may set the 10 unit points or the 20 unit points for the measured second straight line L2 to fifth straight line L5.

Figure 15:
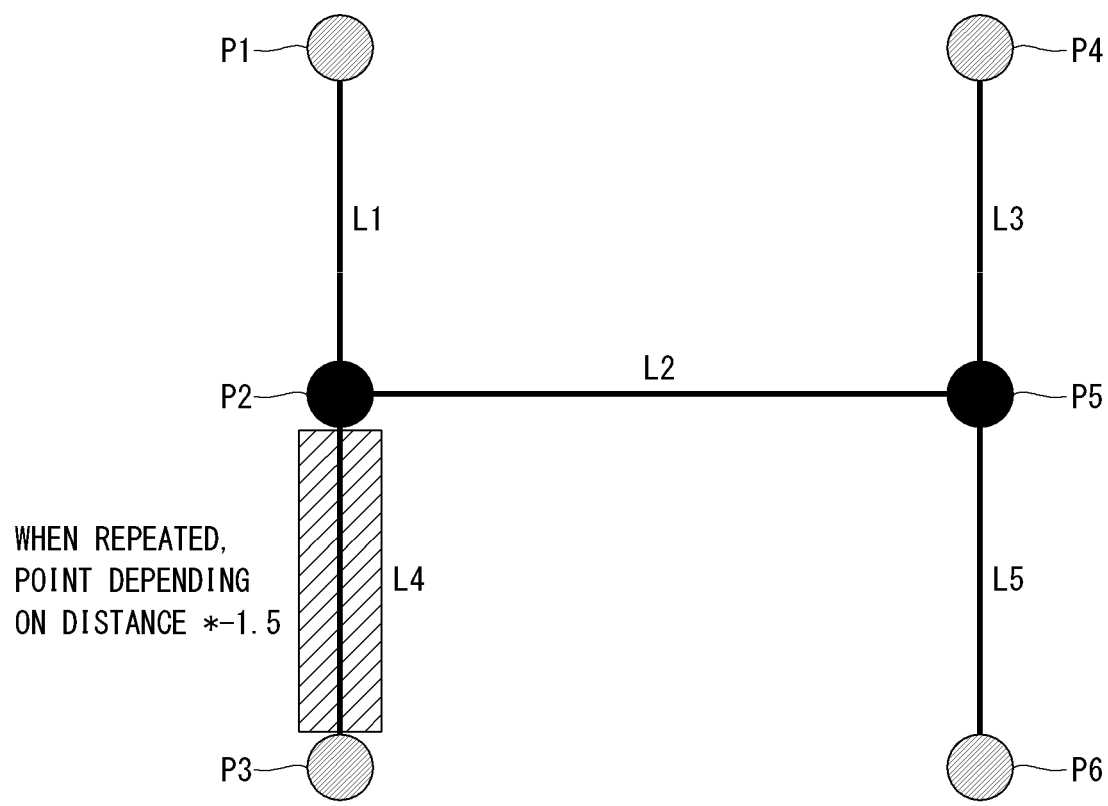

Furthermore, as illustrated in FIG. 15, when the intelligent robot cleaner 100 travels repetitively along at least one straight line of the plurality of straight lines, the unit points may be subtracted or reduced depending on the straight line or distance. For example, if the intelligent robot cleaner 100 repetitively travels along the fourth straight line L4, it is possible to set the unit point by multiplying the unit point and minus (−) 1.5. If the intelligent robot cleaner 100 continuously travels along the first straight line L1 and the fourth straight line L4, the cleaner may obtain a total of 20 unit points that are equal to the sum of 10 unit points. However, when the intelligent robot cleaner 100 repetitively travels along the fourth straight line L4, minus (−)15 unit points may be set by multiplying the 10 unit points and the minus (−) 1.5. Thus, when the intelligent robot cleaner 100 travels along the first straight line L1 and the fourth straight line L4 and repetitively travels again on the fourth straight line L4, a total of 5 unit points may be obtained by subtracting 15 unit points from 20 unit points.

Figure 16:
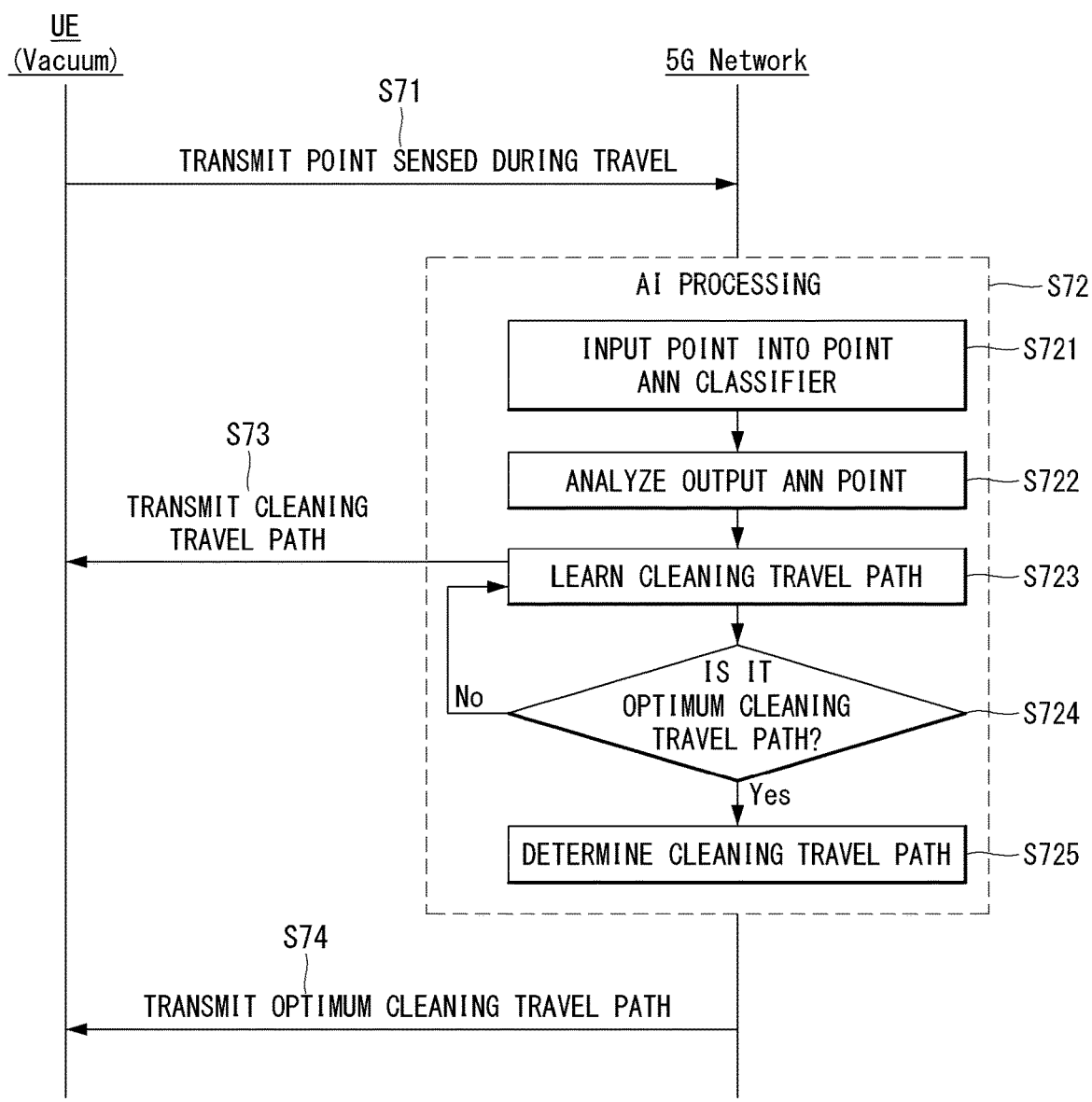
FIG. 16 is a flowchart illustrating a process where the learned intelligent robot cleaner sets an optimum travel path for cleaning in accordance with the embodiment of the present disclosure.

FIG. 16 is a flowchart illustrating a process where the learned intelligent robot cleaner sets an optimum travel path for cleaning in accordance with the embodiment of the present disclosure.

Referring to FIG. 16, a processor may control the communication unit 27 (see FIG. 7) to transmit the cleaning travel path of the intelligent robot cleaner 100 to the AI processor 21 (see FIG. 7) included in the 5G network. Furthermore, the processor may control the communication unit 27 to receive AI processed information from the AI processor 21.

The AI processed information may information that determines the optimum cleaning travel path among various cleaning travel paths.

Meanwhile, the intelligent robot cleaner 100 may perform an initial access procedure with the 5G network to transmit the cleaning travel path to the 5G network. The intelligent robot cleaner 100 may perform the initial access procedure with the 5G network based on a synchronization signal block (SSB).

Furthermore, the intelligent robot cleaner 100 may receive, from the network, downlink control information (DCI) used to schedule the transmission of point information sensed from the image photographed or acquired by the intelligent robot cleaner 100 through a wireless communication unit.

The processor may transmit the point information sensed from the image photographed or acquired based on the DCI to the network.

The point information sensed from the photographed or acquired image may be transmitted through a PUSCH to the network, and the SSB and the DM-RS of the PUSCH may be quasi co-located (QCL) for the QCL type D. The point information may be referred to as a point value.

Referring to FIG. 16, the intelligent robot cleaner 100 may transmit the point sensed from the photographed or acquired image to the 5G network at step S71. The point may be referred to as the unit point sensed from the photographed or acquired image. Here, the 5G network may include the AI processor or the AI system, and the AI system of the 5G network may perform AI processing based on the received sensing information at step S72.

The AI system may input points received from the intelligent robot cleaner 100 to the point ANN classifier at step S721. The AI system may analyze an output ANN point at step S722, and may learn the cleaning travel path from the output ANN point at step S723. The output ANN point may be a sum of sensed unit points while the intelligent robot cleaner 100 travels along the cleaning travel path. The 5G network may transmit the cleaning travel path learned by the AI system through the wireless communication unit to the intelligent robot cleaner 100, at step S73.

When it is determined that the learned cleaning travel path is not the optimum cleaning travel path in various cleaning travels, the AI system may continue to learn the cleaning travel path at step S723.

When it is determined that the learned cleaning travel path is the optimum cleaning travel path in various cleaning travels at step S724, the AI system may determine the cleaning travel path at step S725. Furthermore, the AI system may transmit information about the optimum cleaning travel path to the intelligent robot cleaner 100 at step S74.

Meanwhile, the intelligent robot cleaner 100 may transmit only the sensed point information to the 5G network, and may extract a sum of the output ANN points or unit points corresponding to the optimum cleaning travel path with the input of the artificial neural network for determining the cleaning travel path from the point information sensed in the AI system included in the 5G network.

Although not shown in the drawings, in accordance with the embodiment of the present disclosure, if the optimum cleaning travel path is determined, the intelligent robot cleaner 100 may transmit a message related to the cleaning travel path to home appliances through V2X communication. A V2X terminal installed in the intelligent robot cleaner 100 may exchange various messages with a surrounding V2X base station, the V2X terminal installed in the home appliances, a user's V2X terminal or the like through the V2X communication.

Furthermore, a user's portable V2X terminal may also exchange various messages with the surrounding V2X base station, the V2X terminal installed in the intelligent robot cleaner 100 or the like through the V2X communication.

According to the embodiment of the present disclosure, when the optimum cleaning travel path is set or determined, the intelligent robot cleaner 100 may transmit a message related to the optimum cleaning travel path to the home appliances through the V2X communication.

FIGS. 17 to 20 are diagrams illustrating various examples where the intelligent robot cleaner sets the cleaning travel path in accordance with the embodiment of the present disclosure.

The intelligent robot cleaner 100 may travel on the first point P1 to the sixth point P6, the first straight line L1 to the fifth straight line L5 at least once.

Figure 17:
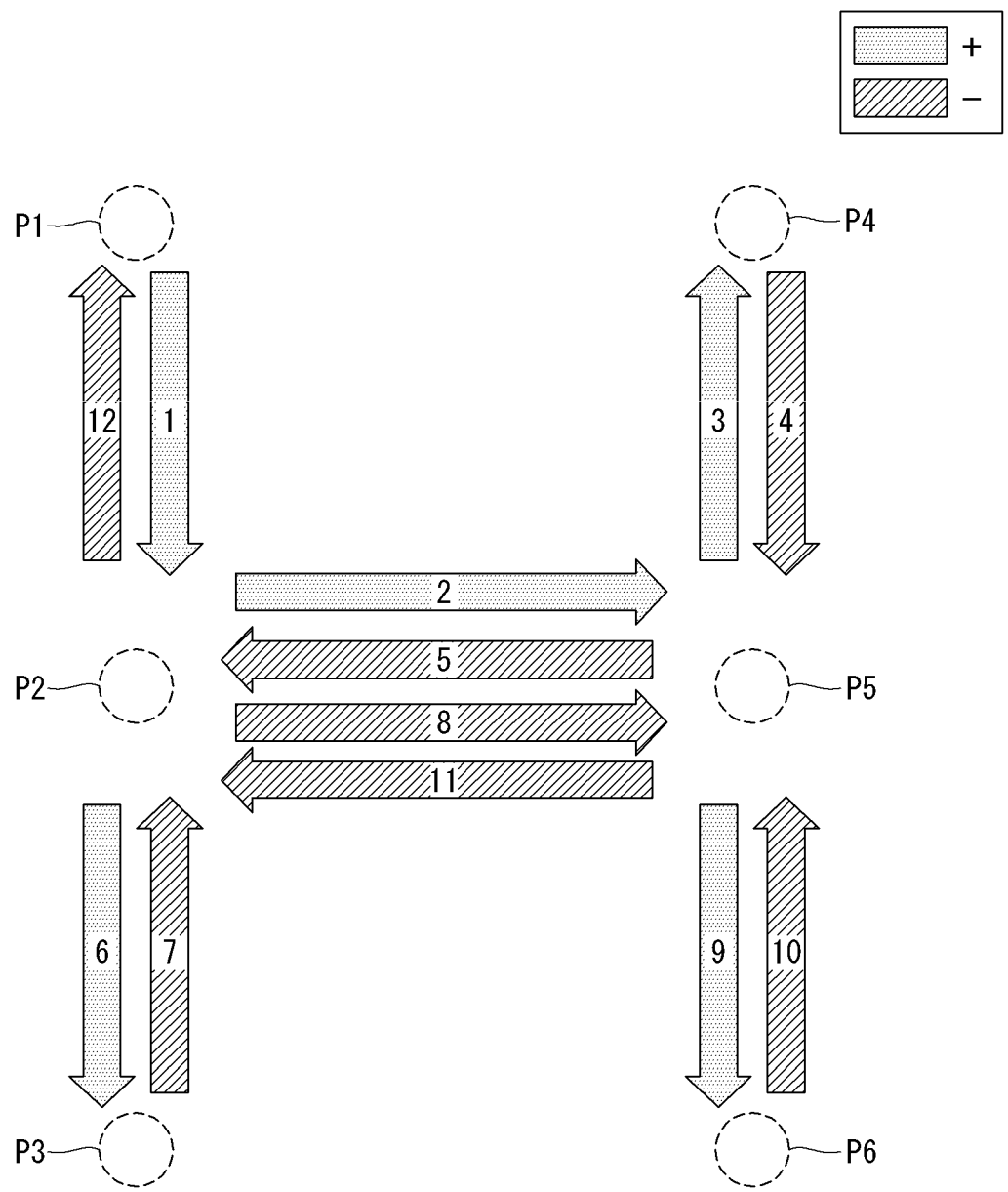
FIGS. 17 to 20 are diagrams illustrating various examples where the intelligent robot cleaner sets the cleaning travel path in accordance with the embodiment of the present disclosure.
Figure 18:
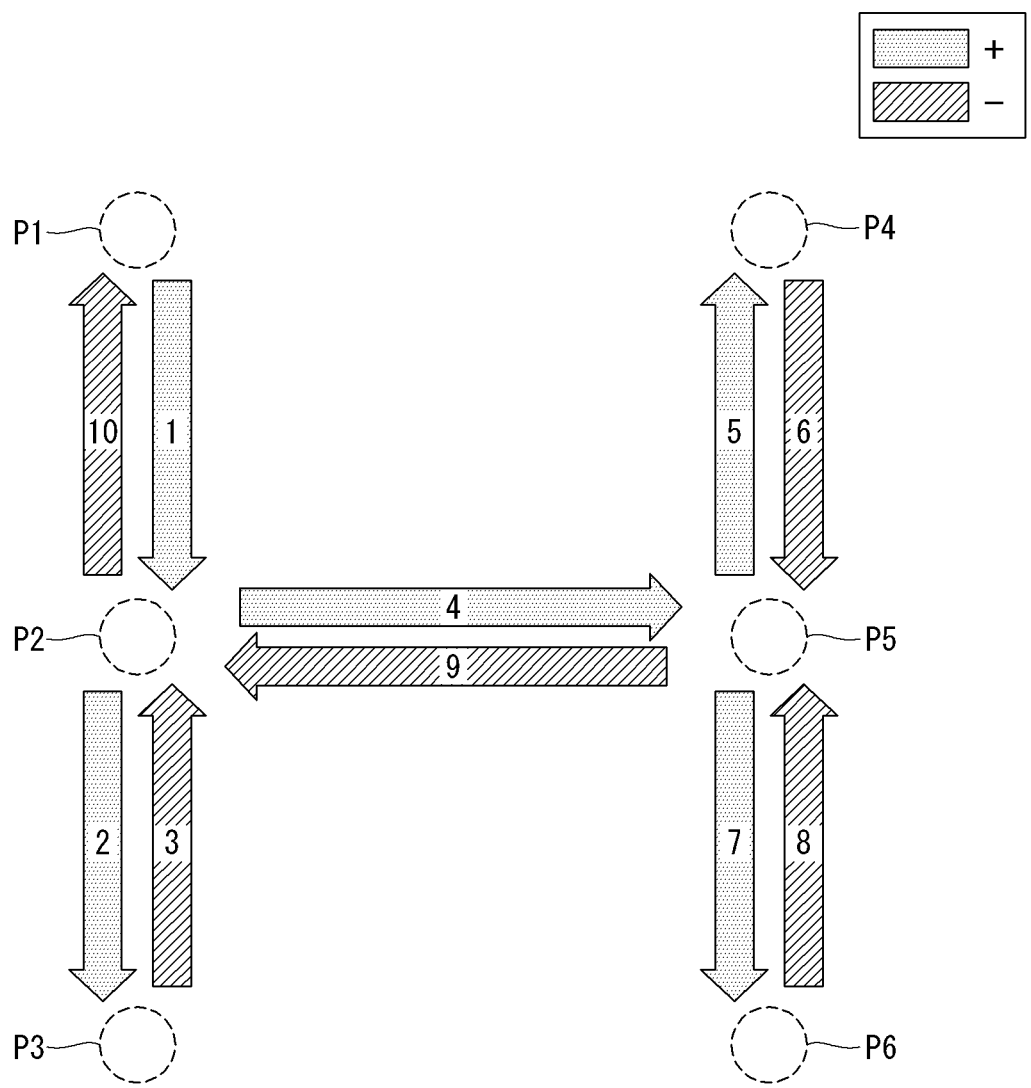
Figure 19:
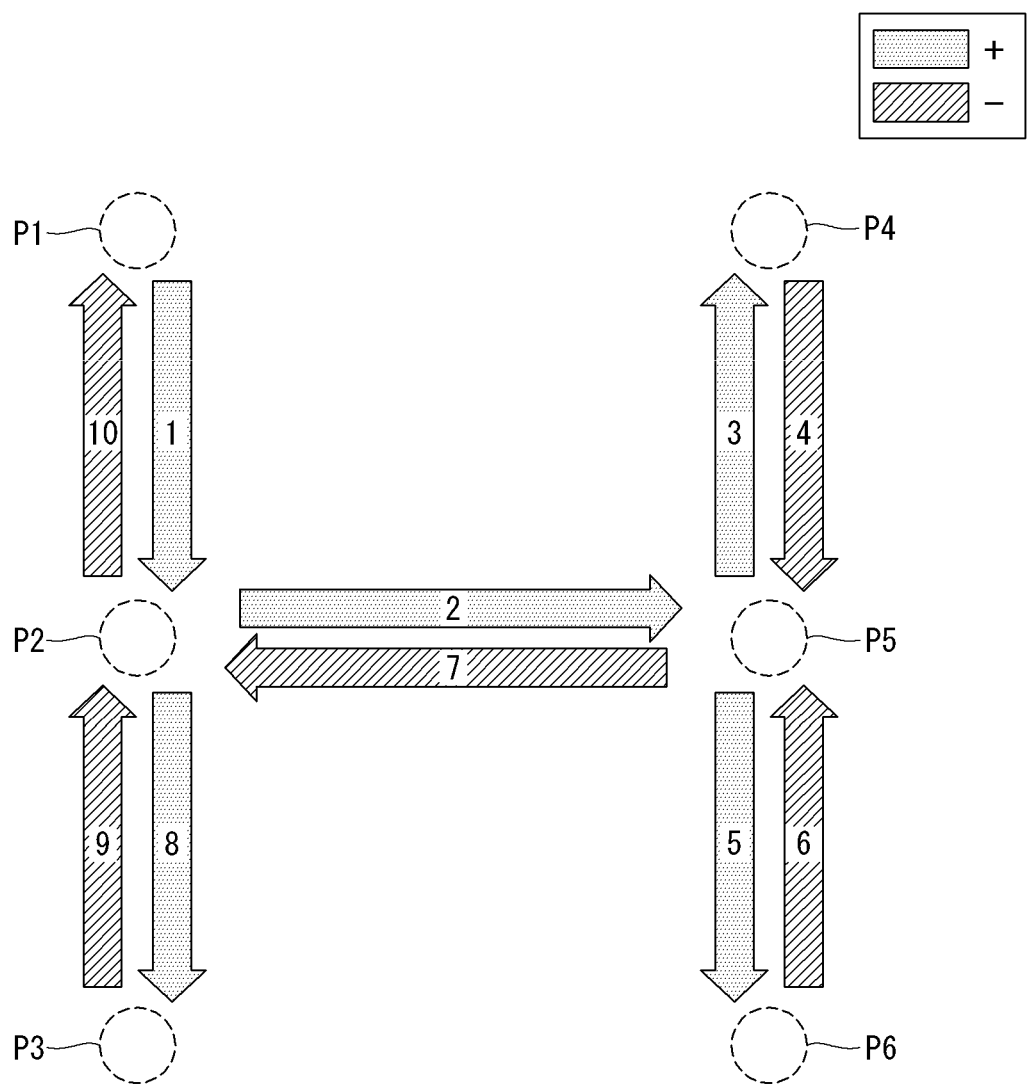
Figure 20:
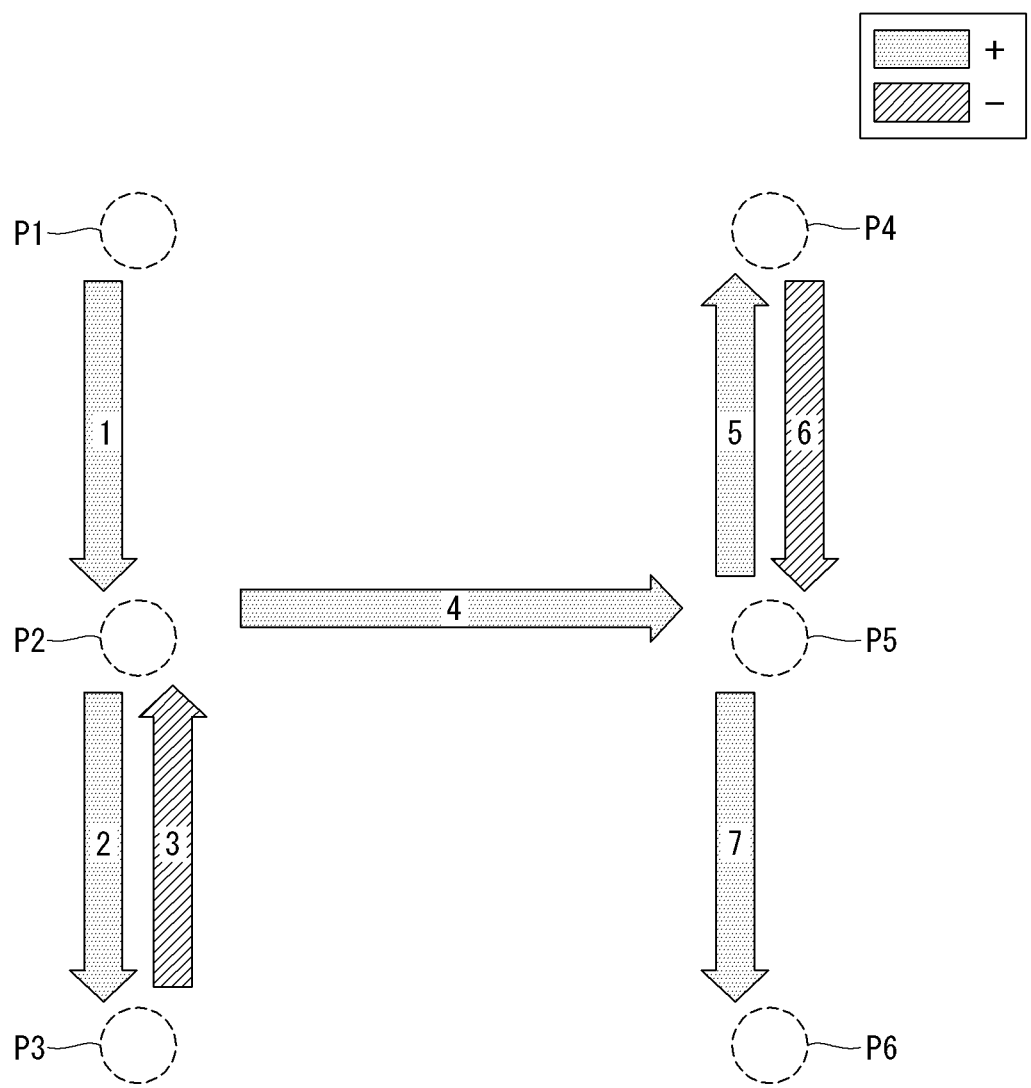

The intelligent robot cleaner 100 may set the start point of cleaning and the close point of cleaning such that they are equal to or different from each other. FIGS. 17 to 19 illustrate a state where the start point of cleaning and the close point of cleaning are set to be equal to each other, and FIG. 20 illustrates a state where the start point of cleaning and the close point of cleaning are set to be different from each other.

The intelligent robot cleaner 100 may learn various cleaning travel paths starting from one of the first point P1 to the sixth point P6, but may return to the start point.

Figure 14:
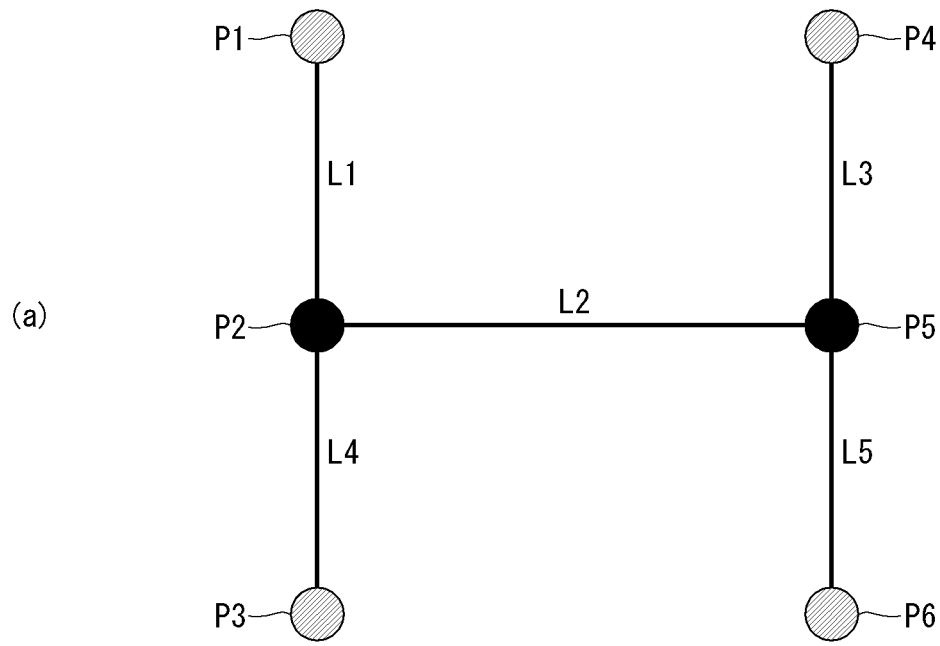
Figure 14:
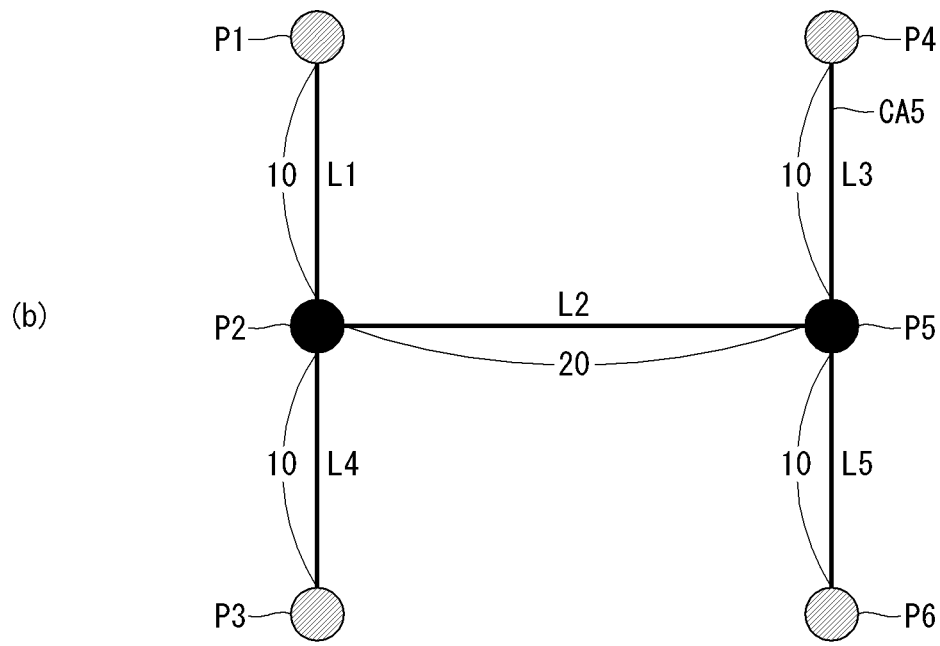

As illustrated in FIG. 17, the intelligent robot cleaner 100 may travel on the first travel path 1 to a twelfth travel path 12. Referring to FIGS. 14 and 17, the first travel path 1 is a path where the cleaner travels through the first point P1, the first straight line L1 and the second point P2, and may acquire plus (+) 10 unit points. The second travel path 2 is a path where the cleaner travels through the second point P2, the second straight line L2 and the fifth point P5, and may acquire plus (+) 20 unit points. The third travel path 3 is a path where the cleaner travels through the fifth point P5, the third straight line L3 and the fourth point P4, and may acquire plus (+) 10 unit points. The fourth travel path 4 is a path where the cleaner travels through the fourth point P4, the third straight line L3 and the fifth point P5, and may acquire minus (−) 15 unit points (10 unit points of L3 times −1.5) since the fourth travel path overlaps with the third travel path 3. The fifth travel path 5 is a path where the cleaner travels through the fifth point P5, the second straight line L2 and the second point P2, and may acquire minus (−) 30 unit points (20 unit points of L2 times −1.5) since the fifth travel path overlaps with the second travel path 2. The sixth travel path 6 is a path where the cleaner travels through the second point P2, the fourth straight line L4 and the third point P3, and may acquire plus (+) 10 unit points. The seventh travel path 7 is a path where the cleaner travels through the third point P3, the fourth straight line L4 and the second point P2, and may acquire minus (−) 15 unit points (10 points of L4 times −1.5) since the seventh travel path overlaps with the sixth travel path 6. The eighth travel path 8 is a path where the cleaner travels through the second point P2, the second straight line L2 and the fifth point P5, and may acquire minus (−) 30 unit points (20 unit points of L2 times −1.5) since the eighth travel path overlaps with the second travel path 2. The ninth travel path 9 is a path where the cleaner travels through the fifth point P5, the fifth straight line L5 and the sixth point P6, and may acquire plus (+) 10 unit points. The tenth travel path 10 is a path where the cleaner travels through the sixth point P6, the fifth straight line L5 and the fifth point P5, and may acquire minus (−) 15 unit points (10 unit points of L5 times −1.5) since the tenth travel path overlaps with the ninth travel path 9. The eleventh travel path 11 is a path where the cleaner travels through the fifth point P5, the second straight line L2 and the second point P2, and may acquire minus (−) 30 unit points (20 unit points of L2 times −1.5) since the eleventh travel path overlaps with the second travel path 2. The twelfth travel path 12 is a path where the cleaner travels through the second point P2, the first straight line L1 and the first point P1, and may acquire minus (−) 15 unit points (10 unit points of L1 times −1.5) since the twelfth travel path overlaps with the first travel path 1.

If the acquired unit points are added together while the intelligent robot cleaner 100 travels along the first travel path 1 to the twelfth travel path 12, minus (−) 90 unit points may be obtained.

As illustrated in FIG. 18, the intelligent robot cleaner 100 may travel on the first travel path 1 to the tenth travel path 10. Referring to FIGS. 14 and 18, the first travel path 1 is a path where the cleaner travels through the first point P1, the first straight line L1 and the second point P2, and may acquire plus (+) 10 unit points. The second travel path 2 is a path where the cleaner travels through the second point P2, the fourth straight line L4 and the third point P3, and may acquire plus (+) 10 unit points. The third travel path 3 is a path where the cleaner travels through the third point P3, the fourth straight line L4 and the second point P2, and may acquire minus (−) 15 unit points (10 unit points of L4 times −1.5) since the third travel path overlaps with the second travel path 2. The fourth travel path 4 is a path where the cleaner travels through the second point P2, the second straight line L2 and the fifth point P5, and may acquire plus (+) 20 unit points. The fifth travel path 5 is a path where the cleaner travels through the fifth point P5, the third straight line L3 and the fourth point P4, and may acquire plus (+) 10 unit points. The sixth travel path 6 is a path where the cleaner travels through the fourth point P4, the third straight line L3 and the fifth point P5, and may acquire minus (−) 15 unit points (10 unit points of L3 times −1.5) since the sixth travel path overlaps with the fifth travel path 5. The seventh travel path 7 is a path where the cleaner travels through the fifth point P5, the fifth straight line L5 and the sixth point P6, and may acquire plus (+) 10 unit points. The eighth travel path 8 is a path where the cleaner travels through the sixth point P6, the fifth straight line L5 and the fifth point P5, and may acquire minus (−) 15 unit points (10 unit points of L5 times −1.5) since the eighth travel path overlaps with the seventh travel path 7. The ninth travel path 9 is a path where the cleaner travels through the fifth point P5, the second straight line L2 and the second point P2, and may acquire minus (−) 30 unit points (20 unit points of L2 times −1.5) since the ninth travel path overlaps with the fourth travel path 4. The tenth travel path 10 is a path where the cleaner travels through the second point P2, the first straight line L1 and the first point P1, and may acquire minus (−) 15 unit points (10 unit points of L1 times −1.5) since the tenth travel path overlaps with the first travel path 1.

If the acquired unit points are added together while the intelligent robot cleaner 100 travels along the first travel path 1 to the tenth travel path 10, minus (−) 30 unit points may be obtained.

As illustrated in FIG. 19, the intelligent robot cleaner 100 may travel on the first travel path 1 to the tenth travel path 10. Referring to FIGS. 14 and 19, the first travel path 1 is a path where the cleaner travels through the first point P1, the first straight line L1 and the second point P2, and may acquire plus (+) 10 unit points. The second travel path 2 is a path where the cleaner travels through the second point P2, the second straight line L2 and the fifth point P5, and may acquire plus (+) 20 unit points. The third travel path 3 is a path where the cleaner travels through the fifth point P5, the third straight line L3 and the fourth point P4, and may acquire plus (+) 10 unit points. The fourth travel path 4 is a path where the cleaner travels through the fourth point P4, the third straight line L3 and the fifth point P5, and may acquire minus (−) 15 unit points since the fourth travel path overlaps with the third travel path 3. The fifth travel path 5 is a path where the cleaner travels through the fifth point P5, the fifth straight line L5 and the sixth point P6, and may acquire plus (+) 10 unit points. The sixth travel path 6 is a path where the cleaner travels through the sixth point P6, the fifth straight line L5 and the fifth point P5, and may acquire minus (−) 15 unit points since the sixth travel path overlaps with the fifth travel path 5. The seventh travel path 7 is a path where the cleaner travels through the fifth point P5, the second straight line L2 and the second point P2, and may acquire minus (−) 30 unit points since the seventh travel path overlaps with the second travel path 2. The eighth travel path 8 is a path where the cleaner travels through the second point P2, the fourth straight line L4 and the third point P3, and may acquire plus (+) 10 unit points. The ninth travel path 9 is a path where the cleaner travels through the third point P3, the fourth straight line L4 and the second point P2, and may acquire minus (−) 15 unit points since the ninth travel path overlaps with the eighth travel path 8. The tenth travel path 10 is a path where the cleaner travels through the second point P2, the first straight line L1 and the second point P2, and may acquire minus (−) 15 unit points since the tenth travel path overlaps with the first travel path 1.

If the acquired unit points are added together while the intelligent robot cleaner 100 travels along the first travel path 1 to the tenth travel path 10, minus (−) 30 unit points may be obtained.

As described above, the intelligent robot cleaner 100 according to the embodiment of the present disclosure may delete or remove the cleaning travel path of FIG. 17 in which the sum of the unit points is minus (−) 90 unit points while the cleaning travel path is the longest among the cleaning travel paths illustrated in FIGS. 17 to 19 based on various AI learning experiences.

Furthermore, the intelligent robot cleaner 100 may select the cleaning travel path of FIG. 18 in which the sum of the unit points is minus (−) 30 unit points among the cleaning travel paths illustrated in FIGS. 17 to 19, or the cleaning travel path of FIG. 19.

Moreover, the intelligent robot cleaner 100 may select or determine either of the cleaning travel path of FIG. 18 or the cleaning travel path of FIG. 19 as the optimum cleaning travel path by adding the surrounding situation, such as obstacles located in the cleaning region, to various learning experiences and then continuing to learn.

Referring to FIG. 20, the intelligent robot cleaner 100 may learn various cleaning travel paths starting from one of the first point P1 to the sixth point P6, and may end at the close point different from the start point. As illustrated in FIG. 20, the intelligent robot cleaner 100 may travel on the first travel path 1 to the seventh travel path 7. Referring to FIGS. 14 and 20, the first travel path 1 is a path where the cleaner travels through the first point P1, the first straight line L1 and the second point P2, and may acquire plus (+) 10 unit points. The second travel path 2 is a path where the cleaner travels through the second point P2, the fourth straight line L4 and the third point P3, and may acquire plus (+) 10 unit points. The third travel path 3 is a path where the cleaner travels through the third point P3, the fourth straight line L4 and the second point P2, and may acquire minus (−) 15 unit points since the third travel path overlaps with the second travel path 2. The fourth travel path 4 is a path where the cleaner travels through the second point P2, the second straight line L2 and the fifth point P5, and may acquire plus (+) 20 unit points. The fifth travel path 5 is a path where the cleaner travels through the fifth point P5, the third straight line L3 and the fourth point P4, and may acquire plus (+) 10 unit points. The sixth travel path 6 is a path where the cleaner travels through the fourth point P4, the third straight line L3 and the fifth point P5, and may acquire minus (−) 15 unit points since the sixth travel path overlaps with the fifth travel path 5. The seventh travel path 7 is a path where the cleaner travels through the fifth point P5, the fifth straight line L5 and the sixth point P6, and may acquire plus (+) 10 unit points.

If the acquired unit points are added together while the intelligent robot cleaner 100 travels along the first travel path 1 to the tenth travel path 10, plus (+) 20 unit points may be obtained.

As described above, the intelligent robot cleaner 100 according to the embodiment of the present disclosure may learn using the points sensed while traveling along various cleaning travel paths, and may determine an optimum cleaning path among the cleaning travel paths learned based on various AI learning experiences.

Furthermore, if the intelligent robot cleaner 100 according to the embodiment of the present disclosure travels along the cleaning travel path overlapped with a preceding cleaning travel path under the control of the control unit 110, the cleaning mode may be turned off and only the travel mode may be turned on. In the cleaning mode, it is possible to operate both a suction motor of the cleaner that may suck up foreign matter or dust and a travel motor of the cleaner that may cause the intelligent robot cleaner 100 to travel. On the other hand, in the travel mode, only the travel motor of the cleaner to cause the intelligent robot cleaner 100 to travel may be operated while the motor of the cleaner being turned off.

If the intelligent robot cleaner 100 is converted into the travel mode, the cleaner may travel on the overlapped cleaning travel path with the minimum power required for the travel.

Figure 21:
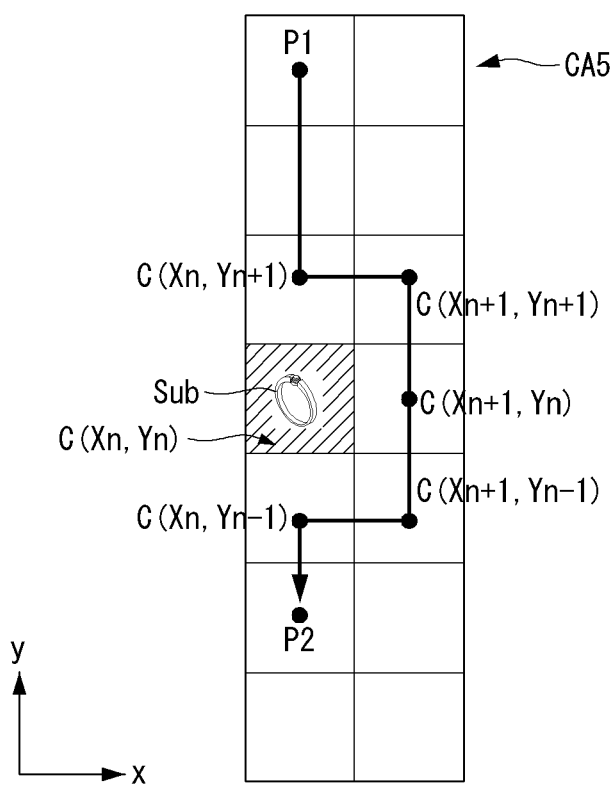
FIGS. 21 and 22 are diagrams illustrating a process in which an intelligent robot cleaner resets a travel path depending on an object in a cleaning travel path in accordance with an embodiment of the present disclosure.
Figure 22:
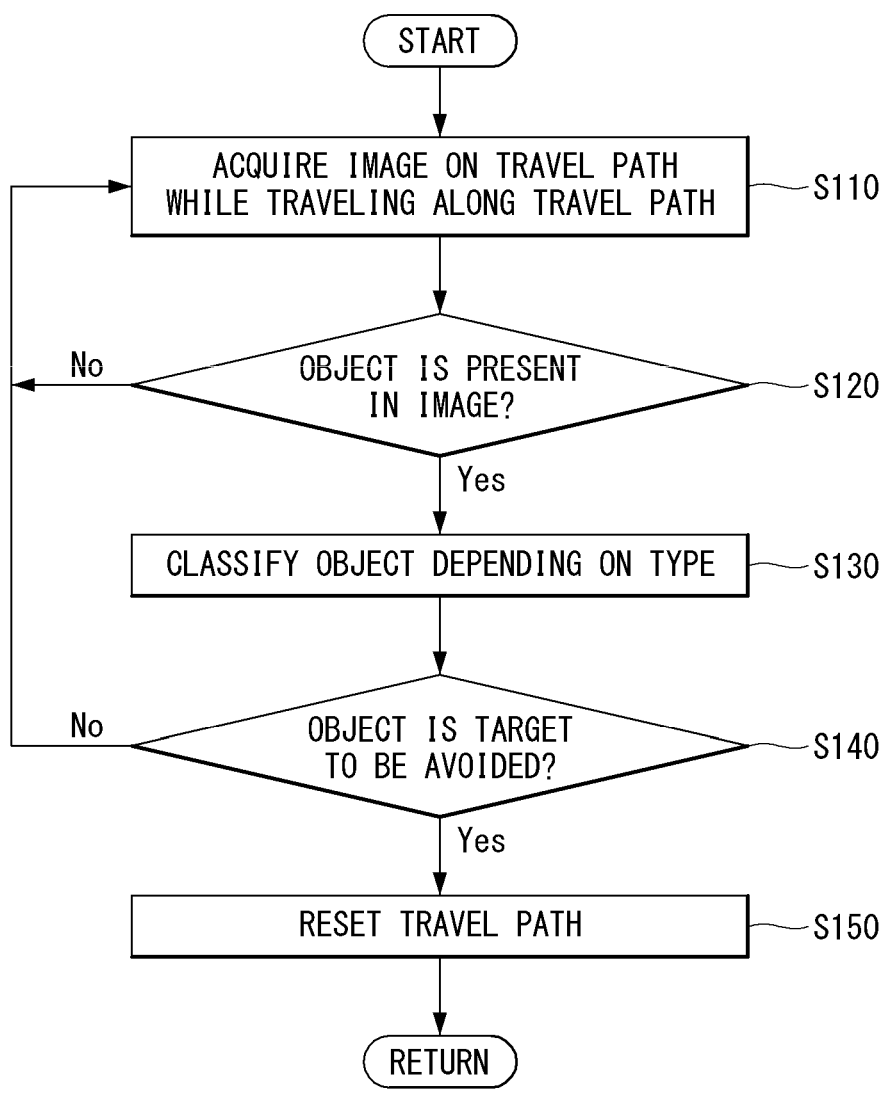

FIGS. 21 and 22 are diagrams illustrating a process in which an intelligent robot cleaner resets a travel path depending on an object in a cleaning travel path in accordance with an embodiment of the present disclosure.

Referring to FIG. 21, the cleaning region CA5 may include a grid arranged regularly on the 2D image. The grid may be referred to as a cell C. The cell may be one room of the grid. The cells C may be distinguished by a 2D coordinate or an intrinsic position coordinate represented by the 2D coordinate. For instance, each of the cells C may have an intrinsic coordinate, and respective corners of the cells C may have intrinsic coordinates. The width of the cell C in the cleaning region CA5 may be set to a width at which the intelligent robot cleaner 100 performs cleaning while traveling. The width of the cell C is not limited thereto, and may be controlled by various obstacles located in the cleaning region CA5.

The intelligent robot cleaner 100 may pass through each cell C sequentially from the start point to the close point, and thus may pass through all cells C of the cleaning region CA5. For example, after the intelligent robot cleaner 100 traverses or travels in a first direction (X-axis direction) from the start point, the cleaner may pass by one cell C in a second direction (Y-axis direction). Subsequently, the intelligent robot cleaner 100 may traverse again in the first direction (X-axis direction) from the cell C at which the cleaner has been moved in the second direction (Y-axis direction). In this manner, the intelligent robot cleaner 100 may travel to the close point while gradually progressing from one side of the cleaning region CA5 to an opposite side thereof.

If the intelligent robot cleaner 100 senses the object Sub while traveling along the cleaning travel path, the cleaner may analyze the sensed object Sub to avoid it. If the object Sub sensed while the intelligent robot cleaner 100 travels along the cleaning travel path is determined as a target to be avoided, the cell C of the cleaning region CA5 in which the object Sub is located may be set as a region to be avoided. For example, after the intelligent robot cleaner 100 travels to a C(Xn, Yn+1) cell, the cell C perpendicular to the cleaning travel path may be selected and thus the cleaner may travel along the cell. For instance, as illustrated in FIG. 21, if the sensed region to be avoided is located on the cleaning travel path while the cleaner traveling in the second direction (Y-axis direction), the cleaning travel path may be corrected such that the intelligent robot cleaner 100 travels in the second direction (Y-axis direction) from the start point to the C(Xn, Yn+1) cell and then travels in the first direction (X-axis direction) to the C(Xn+1, Yn+1) cell. Furthermore, the intelligent robot cleaner 100 may travel in the second direction (Y-axis direction) from the C(Xn+1, Yn+1) cell to the C(Xn+1, Yn−1) cell to completely pass through the C(Xn, Y n) on the Y axis. Subsequently, the intelligent robot cleaner 100 may travel in the first direction (X-axis direction) from the C(Xn+1, Yn−1) cell to the C(Xn, Yn−1) cell. Furthermore, the intelligent robot cleaner 100 may travel from the C(Xn, Yn−1) in the second direction (Y-axis direction) to return to the cleaning travel path before the correction.

Referring to FIG. 22, while the intelligent robot cleaner 100 travels along the cleaning travel path, the cleaner may acquire an image on the cleaning travel path at step S110.

The intelligent robot cleaner 100 may determine whether the object is present in the image acquired by the image acquisition unit 160 (see FIG. 6) at step S120. For example, the intelligent robot cleaner 100 may detect an edge of the image so as to extract the object Sub in the image. The intelligent robot cleaner 100 may use a Sobel mask, a Prewitt mask, a Robert mask or the like to detect the edge. The intelligent robot cleaner 100 may an outermost edge among the detected edges as the contour of the object Sub.

When the object Sub is found under the control of the control unit 110 (see FIG. 6), the intelligent robot cleaner 100 may classify the type of the object Sub, at step S130. Furthermore, the intelligent robot cleaner 100 may determine whether the object Sub classified under the control of the control unit 110 (see FIG. 6) is a target to be avoided, at step S140.

The intelligent robot cleaner 100 may perform comparative analysis to indicate whether the characteristics of the image such as the contour or the characteristic point of the object Sub match with those of the image stored in the memory 190 (see FIG. 6) under the control of the control unit 110 (see FIG. 6). The object Sub may be classified as a target to be avoided or a target to be ignored, and information about the image characteristics of each of the target to be avoided and the target to be ignored may be stored in the memory 190 (see FIG. 6).

For example, the target to be avoided may be classified as any one of the following articles: an immovable article, a fragile article, a contaminant and a suction-prohibiting article. The immovable article may designate an object Sub that is not movable by a driving force of the intelligent robot cleaner 100. For example, the immovable article may be a sofa or a table. The fragile article may be a bottle or a cup made of glass. The contaminant corresponds to a viscous or liquid substance, for example, a sauce and excrement of a companion animal. Due to the nature of the contaminant, its image characteristics may not be constant. The intelligent robot cleaner 100 may determine whether the object Sub is the contaminant in consideration of the shape of the object Sub as well as the transparency of the object Sub. The suction-prohibiting article may be an article that is desired not to be sucked by the suction unit 70 (see FIG. 5) of the intelligent robot cleaner 100. The suction-prohibiting article may designate an article that is not to be cleaned, for example, valuables. In addition to the valuables, small articles that may be frequently left in the cleaning target region, such as buttons, small accessories or keys, may be classified as the suction-prohibiting article.

Furthermore, when the object Sub is classified, a criterion for determining similarity between the image characteristics of the object Sub and the image stored in the memory 190 (see FIG. 6) may vary depending on the type of the target to be avoided.

The intelligent robot cleaner 100 may lower the criterion for determining similarity with respect to the fragile article and the contaminant to allow the cleaner to bypass the fragile article and the contaminant under the control of the control unit 110 (see FIG. 6). Even if the similarity between the image characteristics of the object Sub and the image of the fragile article and the contaminant stored in the memory 190 (see FIG. 6) is somewhat low, the intelligent robot cleaner 100 may define the corresponding object Sub as the target to be avoided, under the control of the control unit 110 (see FIG. 6). The intelligent robot cleaner 100 may vary the criterion depending on the type of the suction-prohibiting article under the control of the control unit 110 (see FIG. 6). For instance, the intelligent robot cleaner 100 may lower a similarity determining criterion for the valuables and may raise a similarity determining criterion for an insignificant article, under the control of the control unit 110 (see FIG. 6).

The intelligent robot cleaner 100 may considerably raise a similarity determining criterion for the immovable article, under the control of the control unit 110 (see FIG. 6). For example, if the cleaner is not movable by an object that is not determined as the immovable article while the cleaner traveling along the cell C in which the object Sub that is not determined as the immovable article is located, the intelligent robot cleaner 100 may set a bypass travel path to bypass the corresponding object Sub. Subsequently, the intelligent robot cleaner 100 may define the corresponding object Sub as the immovable article, and then may store the image of the corresponding object in the memory 190. Therefore, if the corresponding object Sub is extracted from the subsequently acquired image, the intelligent robot cleaner 100 may determine the object as the immovable article.

For example, if the object Sub is a light toy that does not hinder the intelligent robot cleaner 100 from traveling, the intelligent robot cleaner 100 may perform the AI learning process to naturally remove the corresponding object Sub from the target to be avoided.

The intelligent robot cleaner 100 may define the target to be avoided using a basic algorithm installed in the control unit 110 (see FIG. 6), and may consider objects Sub other than the target to be avoided as the target to be ignored. The object Sub defined as the target to be ignored may be considered as an exceptional target to be treated.

If the intelligent robot cleaner 100 senses the object Sub considered as the target to be ignored from the image of the cleaning travel path, the cleaner may clean while continuing to travel along the cleaning travel path. The intelligent robot cleaner 100 may push the target to be ignored out of the cleaning travel path, and then may clean the cell C in which the corresponding object that is the target to be ignored is located.

If the object is the target to be avoided, the intelligent robot cleaner 100 may set the bypass travel path to avoid the target to be avoided. Since this has been described in detail with reference to FIG. 21, a duplicated description thereof will be omitted herein.

The intelligent robot cleaner 100 may continuously repeat the above-described steps until the cleaner passes through all the cells C of the cleaning region.

The invention claimed is:

1. A travel method of an intelligent robot cleaner, comprising:
    extracting, by a processor, a cleaning space using an image photographed while traveling inside a building;
    generating, by the processor, a 3D image in the cleaning space;
    extracting, by the processor, spatial data from the 3D image, converting the extracted spatial data into plane data, and generating a 2D image using the converted plane data;
    extracting, by the processor, a first region that allows cleaning and a second region that does not require cleaning from the 2D image, and simplifying the 2D image by removing the second region;
    generating, by the processor, a plurality of ends each representing a distal end of the first region and a plurality of intersections each representing a point of intersection of cleaning subregions of the first region based on the simplified 2D image;
    measuring, by the processor, distances of respective straight lines each of which comprises as end points two selected among the plurality of ends, distances of respective straight lines each of which comprises as end points two selected among the plurality of intersections, and distances of respective straight lines each of which comprises as one end point one selected among the plurality of ends and as the other end point one selected among the plurality of intersections, and setting a point value for each of the straight lines to be proportional to a corresponding measured stance;
    forming, by the processor, a plurality of cleaning travel paths each of which comprises at least a part of the straight lines;
    accumulating a total point value for each of the plurality of cleaning travel paths by totaling the corresponding set point values for each of the straight lines of the cleaning travel path, wherein a negative weight value is applied to a set point value for each instance that a straight line is traveled more than once; and
    determining, by the processor, a final cleaning travel path among the plurality of cleaning travel paths based on the calculated total point value.

2. The travel method of claim 1, wherein a probability of a cleaning travel path being selected as the final cleaning travel path is higher based on a higher total point value.

3. The travel method of claim 1, wherein the extracting of the cleaning space comprises:
    extracting an image characteristic value from the image photographed while the cleaner travels inside the building;
    inputting the image characteristic value into an artificial neural network classifier;
    analyzing an output value outputted from the artificial neural network classifier; and
    extracting the cleaning space inside the building from the output value.

4. The travel method of claim 1, wherein the extracting of the cleaning space is based on analysis of a cleaning map of an inside of the building.

5. The travel method of claim 1, wherein the negative weight value is −1.5.

6. The travel method of claim 1, further comprising:
    turning off a suction motor when the cleaner travels along a particular straight line belonging to the final cleaning travel path for a second time or more.

7. The travel method of claim 1, further comprising:
    receiving, by the processor, downlink control information (DCI) used to schedule transmission of the set point values from a network,
    wherein the set point values are transmitted to the network based on the DCI.

8. The travel method of claim 7, further comprising:
    performing, by the processor, an initial access procedure with the network based on a synchronization signal block (SSB),
    wherein the set point values are transmitted through physical uplink shared channel (PUSCH) to the network, and the SSB and demodulation reference signal (DMRS) of the PUSCH is quasi co-located (QCL) for a QCL type D.

9. The travel method of claim 8, further comprising:
    controlling, by the processor, a communication unit to transmit the set point values to an artificial intelligence (AI) processor included in the network; and controlling, by the processor, the communication unit to receive AI processed information from the AI processor,
wherein the AI processed information is information that determines the final cleaning travel path among the plurality of cleaning travel paths.

* * * * *